United States Patent
Spellmeyer et al.

(10) Patent No.: US 7,654,601 B2
(45) Date of Patent: Feb. 2, 2010

(54) OPERATOR SEAT FOR CONSTRUCTION MACHINE, AND CAB AND CONSTRUCTION MACHINE INCLUDING THE SAME

(75) Inventors: Gunnar Spellmeyer, Hannover (DE); Birgit Weller, Hannover (DE); Jonas Claudy, Hannover (DE); Simon Hellwig, Hannover (DE); Jan Henemann, Hannover (DE); Christian Grajewski, Rittergut Esbeck (DE); Florian Kristen, Hannover (DE); Christian Schuschan, Langenhagen (DE); Christoph Pröβler, Hannover (DE); Felix Runde, Hannover (DE)

(73) Assignee: Komatsu Ltd., Tokyo (JP)

( * ) Notice: Subject to any disclaimer, the term of this patent is extended or adjusted under 35 U.S.C. 154(b) by 25 days.

(21) Appl. No.: 12/119,247

(22) Filed: May 12, 2008

(65) Prior Publication Data
US 2008/0290694 A1 Nov. 27, 2008

(30) Foreign Application Priority Data
May 21, 2007 (DE) ........................ 10 2007 023 568

(51) Int. Cl.
*B60N 2/14* (2006.01)
(52) U.S. Cl. .................................. 296/65.06; 296/68.1
(58) Field of Classification Search ................... 296/63, 296/65.01, 68.1, 65.05–65.07, 190.01, 190.03; 297/344.21, 344.22, 344.23; 244/118.5, 244/118.6
See application file for complete search history.

(56) References Cited

U.S. PATENT DOCUMENTS

| | | | | |
|---|---|---|---|---|
| 2,389,852 A | * | 11/1945 | Hagner | 33/268 |
| 2,606,727 A | * | 8/1952 | De Haven | 244/118.6 |
| 3,591,234 A | * | 7/1971 | Condon | 297/344.2 |
| 3,630,566 A | * | 12/1971 | Barecki | 296/63 |
| 3,922,029 A | * | 11/1975 | Urai | 296/68.1 |
| 3,986,748 A | * | 10/1976 | Magnuson | 296/65.02 |
| 4,026,379 A | * | 5/1977 | Dunn et al. | 180/331 |
| 4,474,347 A | * | 10/1984 | Mazelsky | 244/122 R |
| 5,016,722 A | * | 5/1991 | Morita et al. | 180/89.14 |
| 6,409,243 B1 | * | 6/2002 | Hansen | 296/68.1 |
| 6,663,173 B1 | * | 12/2003 | Corfitsen | 297/62 |
| 6,805,033 B2 | * | 10/2004 | Mauthe et al. | 89/36.01 |

(Continued)

FOREIGN PATENT DOCUMENTS

DE   195 32 025 A1   3/1997

(Continued)

*Primary Examiner*—Glenn Dayoan
*Assistant Examiner*—Gregory Blankenship
(74) *Attorney, Agent, or Firm*—Global IP Counselors

(57) ABSTRACT

A construction vehicle includes vehicle frames, an operator cab, a hydraulic oil tank, and engine, and an engine cover. The operator cab is mounted on the vehicle frames. The hydraulic oil tank is disposed to the rear of the operator cab and stores hydraulic oil. The engine is disposed to the rear of the hydraulic oil tank. The engine cover is a member that covers the engine. A rear face of the hydraulic oil tank and a front face of the engine cover are the same size in a widthwise direction. A rear end of an upper face of the hydraulic oil tank is positioned at the same height as a front end of the upper face of the engine cover. The upper face and side faces of the hydraulic oil tank are exposed to outside.

10 Claims, 8 Drawing Sheets

U.S. PATENT DOCUMENTS

| | | | |
|---|---|---|---|
| 6,814,174 B2 * | 11/2004 | Fluent et al. | 180/329 |
| 7,059,680 B2 * | 6/2006 | Billger et al. | 297/344.22 |
| 7,121,608 B2 * | 10/2006 | Billger et al. | 296/65.06 |
| 7,229,118 B2 * | 6/2007 | Saberan et al. | 296/65.01 |
| 7,270,371 B2 * | 9/2007 | Adragna et al. | 297/14 |
| 7,506,918 B2 * | 3/2009 | Magni | 296/190.08 |
| 7,513,558 B2 * | 4/2009 | Hansen | 296/68.1 |
| 2003/0230447 A1 | 12/2003 | Wulfert et al. | |
| 2009/0015049 A1 * | 1/2009 | Kanamori et al. | 297/340 |

FOREIGN PATENT DOCUMENTS

| | | |
|---|---|---|
| DE | 698 00 869 T2 | 2/2002 |
| EP | 1 582 635 A2 | 10/2005 |
| JP | 2000-168499 A | 6/2000 |
| WO | WO-98/41419 | 9/1998 |

* cited by examiner

OPERATOR SEAT FOR CONSTRUCTION MACHINE, AND CAB AND CONSTRUCTION MACHINE INCLUDING THE SAME

CROSS-REFERENCE TO RELATED APPLICATIONS

This U.S. National stage application claims priority under 35 U.S.C. §119(a) to Japanese Patent Application No. 2005-365297, filed in Japan on Dec. 19, 2005. The entire disclosure of Japanese Patent Application No. 2005-365297 is hereby incorporated herein by reference.

TECHNICAL FIELD

The present invention relates to a construction vehicle.

BACKGROUND ART

A hydraulic oil tank for storing hydraulic oil such as hydraulic oil supplied to a hydraulic oil pump is provided at a construction vehicle. This hydraulic oil tank is provided in the vicinity of a side end of a vehicle frame. For example, in a construction vehicle disclosed in Japanese Patent Application Laid-open No. 2002-97666, a hydraulic oil tank is provided in the vicinity of a side end of a vehicle frame on a working equipment side. A battery storage case is disposed to the front of the hydraulic oil tank and an engine room is disposed to the rear of the hydraulic oil tank.

DISCLOSURE OF INVENTION

With the construction vehicle described above, an upper face and one side face of the hydraulic oil tank are exposed to outside but other portions of the hydraulic oil tank are covered by the working equipment, battery storage case, and engine room etc. The surface area exposed to the outside is therefore small. There is therefore the fear that the effect of cooling of hydraulic oil stored in the hydraulic oil tank will be diminished.

The object of the present invention is therefore to provide a construction vehicle where the extent by which hydraulic oil stored in the hydraulic oil tank is cooled is increased.

The construction vehicle of a first aspect of the invention includes a vehicle frame, an operator cab, a hydraulic oil tank, an engine, and an engine cover. The operator cab is mounted on the vehicle frame. The hydraulic oil tank is disposed to the rear of the operator cab and stores hydraulic oil. The engine is disposed to the rear of the hydraulic oil tank. The engine cover is a member that covers the engine. The rear face of the hydraulic oil tank and the front face of the engine cover are the same size in the widthwise direction, and the rear end of a upper face of the hydraulic oil tank is positioned at the same height as the front end of a upper face of the engine cover. The upper face and both side faces of the hydraulic oil tank are exposed to outside.

At the construction vehicle, the upper face and both of the side faces of the hydraulic oil tank are exposed to outside. The surface area of the hydraulic oil tank that is exposed to outside is therefore large. It is therefore possible to increase the extent by which hydraulic oil stored in the hydraulic oil tank is cooled. Further, there is the feature that degradation of the external appearance could lower attractiveness when the exposure of the hydraulic oil tank to outside becomes substantial. However, with this construction vehicle, the rear face of the hydraulic oil tank and the front face of the engine cover are the same size in a widthwise direction and the rear end of the upper face of the hydraulic oil tank is positioned at the same height as the front end of the upper face of the engine cover. As a result, the upper face and both of the side faces of the hydraulic oil tank exposed to outside are flush with the upper face and both of the side faces of the engine cover disposed to the rear. There is therefore little detriment to the external appearance. As a result, with this construction vehicle, it is possible to increase the extent to which hydraulic oil stored in the hydraulic oil tank is cooled and degradation of the external appearance is suppressed.

The construction vehicle of a second aspect of the invention is the construction vehicle of the first aspect of the invention with the hydraulic oil tank disposed on a center axis in a widthwise direction of the vehicle frame.

The hydraulic oil tank is a portion that stores hydraulic oil and is therefore comparatively heavy. The weight is therefore unevenly distributed when the hydraulic oil tank is only provided in the vicinity of a side end of the vehicle frame as with conventional construction vehicles.

However, with this construction vehicle, it is possible to reduce uneven distribution of weight using the hydraulic oil tank by disposing the hydraulic oil tank on a center axis in a widthwise direction of the vehicle frame. As a result, it is possible to improve weight balance with this construction vehicle.

The construction vehicle of a third aspect of the invention is the construction vehicle of the second aspect of the invention with the center of the hydraulic oil tank in a widthwise direction positioned on a center axis in a widthwise direction of the vehicle frame.

It is possible to improve the balance of weight with this construction vehicle by positioning the center of the hydraulic oil tank in a widthwise direction on a center axis in a widthwise direction of the vehicle frame.

The construction vehicle of a fourth aspect of the invention is the construction vehicle of the third aspect of the invention with the hydraulic oil tank having an inlet port that hydraulic oil flowing out from the hydraulic oil tank passes through and a strainer that covers the inlet port. The strainer is positioned on a center axis in a widthwise direction of the vehicle frame.

With this construction vehicle, the strainer is positioned on a center axis in a widthwise direction of the vehicle frame. Inclination of the vehicle frame while taking in hydraulic oil from the strainer therefore has little effect. It is therefore possible to stably provide hydraulic oil from the hydraulic oil tank with this construction vehicle.

The construction vehicle of a fifth aspect of the invention is the construction vehicle of the first aspect of the invention further comprising a hydraulic oil piping unit that hydraulic oil flowing out from the hydraulic oil tank and flowing into the hydraulic oil tank passes through. This hydraulic oil piping passes within the vehicle frame and is connected to the lower face, front face, or rear face of the hydraulic oil tank.

With this construction vehicle, the hydraulic oil piping unit passes within the vehicle frame and is connected to the lower face, front face, or rear face of the hydraulic oil tank. On the other hand, the operator cab is disposed to the front of the hydraulic oil tank and the engine cover is disposed to the rear of the hydraulic oil tank. The hydraulic oil piping connected to the hydraulic oil tank therefore does not degrade the external appearance and it is possible to improve attractiveness.

The construction vehicle of a sixth aspect of the invention is the construction vehicle of any one of the first to fifth aspects of the invention further including a radiator and air conditioning equipment. The radiator is disposed to the rear of the engine, and is apparatus for cooling the engine. The air conditioning equipment has an air conditioning equipment body and a condenser for performing air conditioning (provide conditioned air) within the operator cab. The air conditioning equipment body is disposed to the front of the operator cab. The condenser is disposed to the front of the radiator.

With construction vehicles of the related art, the arrangement of air conditioning equipment in space to the rear of the operator cab is common. This restricts the installation space and makes arrangement of the hydraulic oil tank to the rear of the operator cab difficult. There is also the fear that portions to the rear of the operator cab will become large even when arrangement of the hydraulic oil tank to the rear of the operator cab is possible.

However, with this construction vehicle, the air conditioning equipment body is disposed to the front of the operator cab and the condenser is disposed to the front of the radiator. It is therefore possible to suppress increases in size of portions to the rear of the operator cab and disposing of the hydraulic oil tank to the rear of the operator cab is possible.

BEST MODE FOR CARRYING OUT THE INVENTION

Structure

Figure 1:
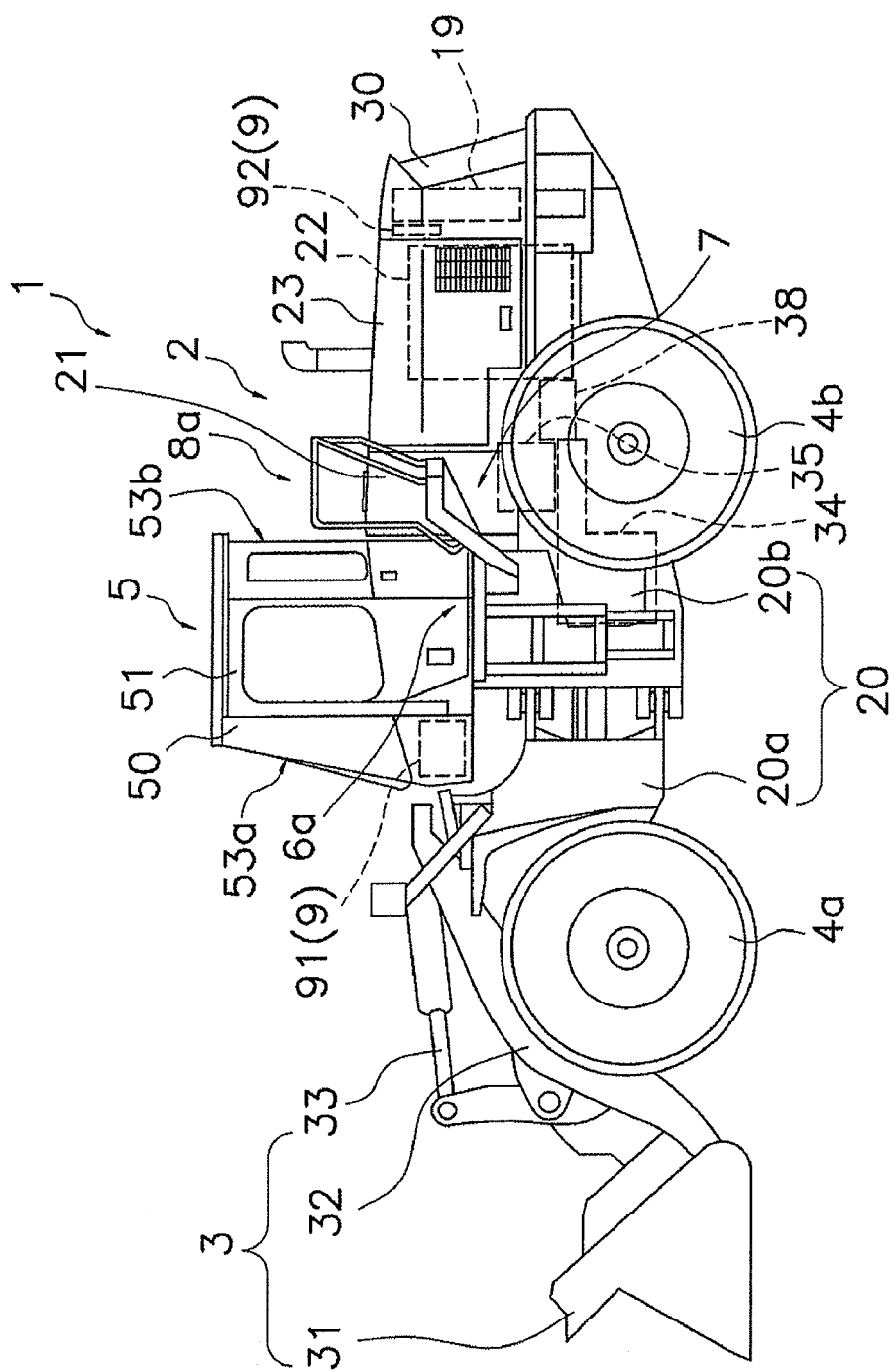
FIG. 1 is a left side view of a construction vehicle.

A left side view of a construction vehicle 1 of an embodiment of the present invention is shown in FIG. 1. This construction vehicle 1 is a wheel loader that is capable of propelling itself using the tires 4a, 4b and is capable of carrying out desired operations using working equipment 3. The construction vehicle 1 mainly includes a vehicle body 2, the tires 4a, 4b, the working equipment 3, a operator cab 5, an air conditioning equipment 9, side steps 6a, 6b (refer to FIG. 6), a fender 7, and bars 8a, 8b (refer to FIG. 6).

Vehicle Body 2

The vehicle body 2 has a vehicle frame 20, a hydraulic oil tank 21, an engine 22, a transmission 34, a torque converter 38, a hydraulic oil pump 35, and an engine cover 23, etc.

Vehicle Frame 20

The vehicle frame 20 has a front frame 20a disposed to the front side, and a rear frame 20b disposed to the rear side. The front frame 20a and the rear frame 20b are coupled in a manner enabling rocking in a lateral direction at a center part of the vehicle frame 20. The working equipment 3 is fitted to the front frame 20a and drive equipment such as the engine 22, the torque converter 38, and the transmission 34 etc. and the hydraulic oil pump 35 are mounted on the rear frame 20b.

Hydraulic Oil Tank 21

Figure 2:
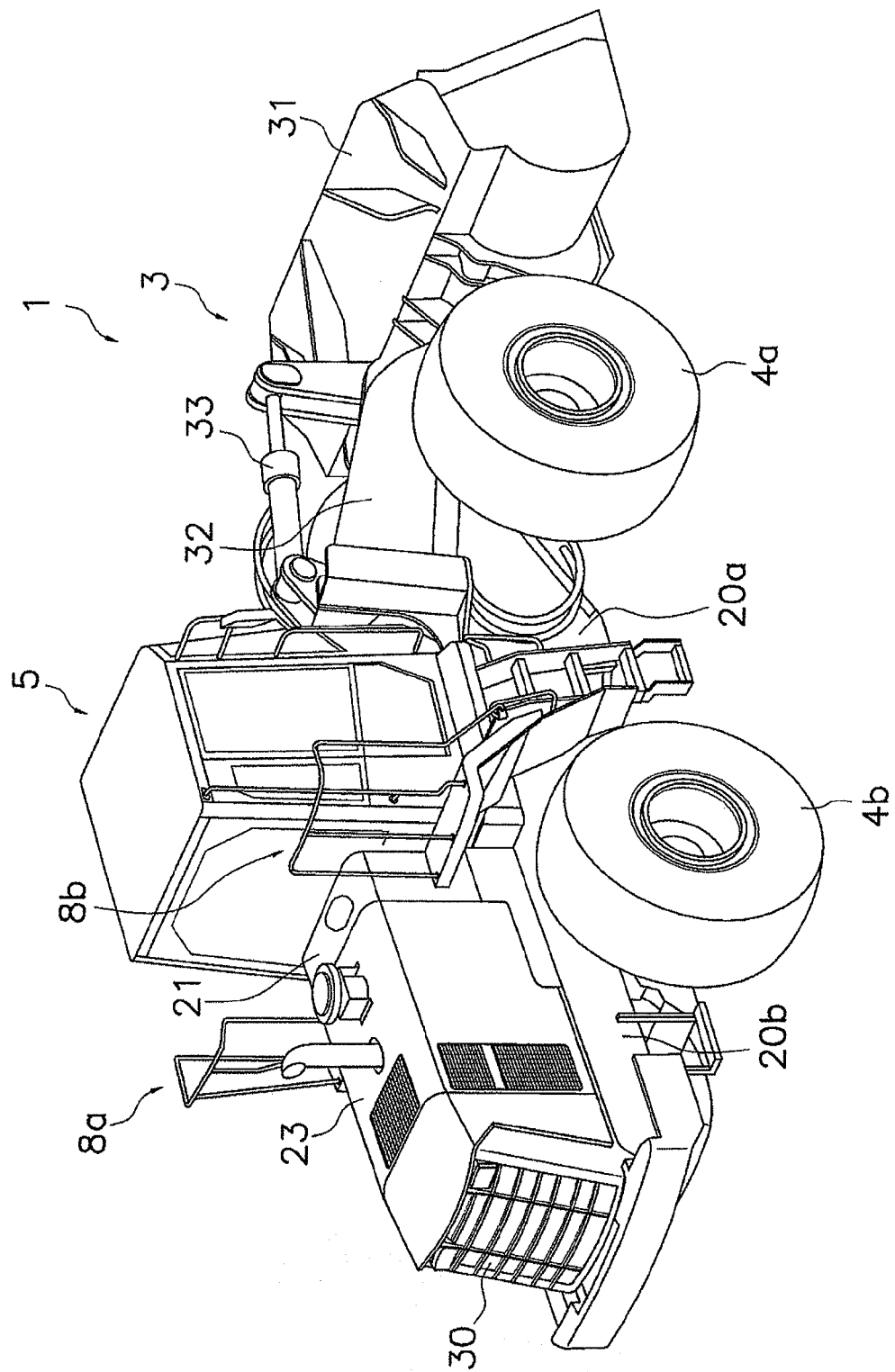
FIG. 2 is a perspective view of the construction vehicle from the rear right.

The hydraulic oil tank 21 internally stores hydraulic oil subjected to pressure by the hydraulic oil pump 35 and is disposed to the rear of the operator cab 5. An upper face of the hydraulic oil tank 21 is positioned lower than an upper face of the operator cab 5 and is positioned lower than upper ends of the bars 8a, 8b. The rear end of the upper face of the hydraulic oil tank 21 is positioned at the same height as the front end of the upper face of the engine cover 23. Further, as shown in FIG. 2, the hydraulic oil tank 21 is smaller in a widthwise direction than the operator cab 5 and the rear face of the hydraulic oil tank 21 and the front face of the engine cover 23 are the same size in a widthwise direction. The outer face of the hydraulic oil tank 21 is therefore flush with the outer face of the engine cover 23. Namely, the side face and upper face of the hydraulic oil tank 21 are flush with the side face and the upper face of the engine cover 23. Further, an external cover covering the hydraulic oil tank 21 therefore does not have to be provided and the outer face of the hydraulic oil tank 21 is therefore exposed to outside. Here, "flush" means that there are no substantial steps at the boundary of the hydraulic oil tank 21 and the engine cover 23 with the contours being roughly continuous, and the boundaries not necessarily have to be smooth faces with no joints. The presence of a step at part of the boundary of the hydraulic oil tank 21 and the engine cover 23 is possible.

Figure 3:
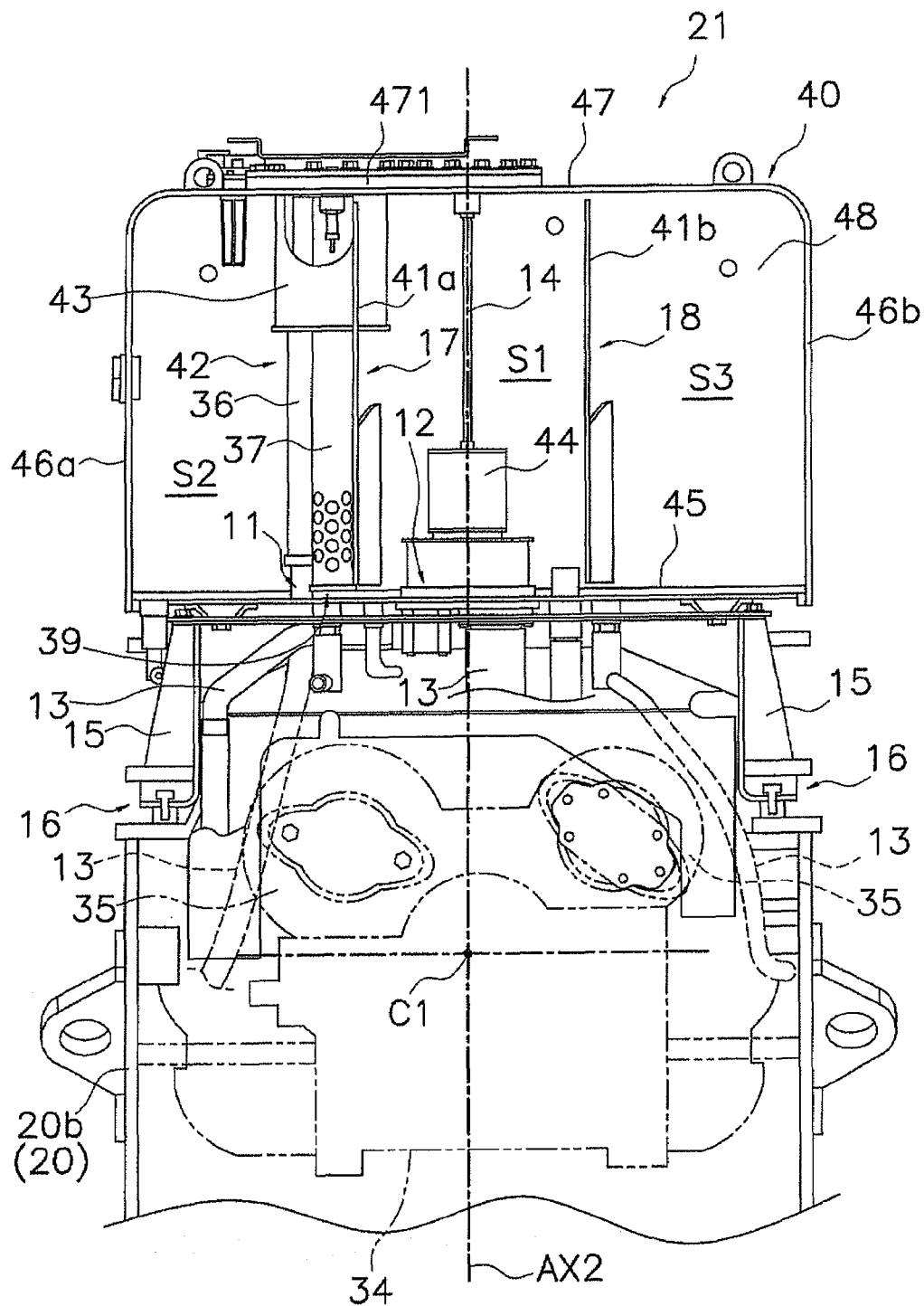
FIG. 3 is a cross-section of a hydraulic oil tank (viewed from the front).

FIG. 3 shows a cross-sectional view of the hydraulic oil tank 21. FIG. 3 is a cross-sectional view of the hydraulic oil tank 21 as viewed from the front. The hydraulic oil tank 21 has a tank body 40, partitions 41a, 41b, a hydraulic oil guide pipe 42, a filter 43, and a strainer 44, etc.

The tank body 40 is a box-shaped member formed from metal plates, and has a bottom plate 45, side plates 46a, 46b, top plate 47, front plate (not shown) and rear plate 48.

The bottom plate 45 constitutes a lower face of the tank body 40 and is disposed in a substantially horizontal manner. The bottom plate 45 is arranged on the rear frame 20b via mounting legs 15. The bottom plate 45 is fitted to the rear frame 20b via mounts 16. A return port 11 hydraulic oil returning to the hydraulic oil tank 21 passes through and an inlet port 12 hydraulic oil flowing out from the hydraulic oil tank 21 passes through are provided at the bottom plate 45. Hydraulic oil piping 13 arranged within the vehicle frame 20 that fluid flowing out from the hydraulic oil tank 21 and fluid flowing into the hydraulic oil tank 21 passes through is also connected to the bottom plate 45.

The side plates 46a, 46b constitute side faces of the tank body 40 and are provided substantially perpendicularly with regards to the bottom plate 45. The side plates 46a, 46b are a right side plate 46a and a left side plate 46b, and are connected with a right side end and a left side end of the bottom plate 45.

In this embodiment, "right" and "left" mean "right" and "left" as viewed from the front (bucket 31 side) of the operator cab 5.

The top plate 47 constitutes the upper face of the tank body 40 and is provided in a substantially horizontal manner. A cover 471 is fixed using bolts to the top plate 47 and the filter 43 and one end of a strainer rod 14 are fitted to the inner face of the cover 471.

The front plate constitutes the front face of the tank body 40 and is provided substantially perpendicularly with respect to the bottom plate 45. The front plate is connected to the front end of the bottom plate 45, front end of the side plates 46a, 46*b*, and the front end of the top plate 47 and faces towards the rear face of the operator cab 5.

The rear plate 48 constitutes the rear face of the tank body 40 and is provided substantially perpendicularly with respect to the bottom plate 45. The rear plate 48 is connected to the rear end of the bottom plate 45, the rear ends of the side plates 46*a*, 46*b* and the rear end of the top plate 47 and faces the front face of the engine cover 23.

Further, the tank body 40 is disposed on a center axis AX2 in a widthwise direction of the vehicle frame 20 and the center in a widthwise direction of the tank body 40 is positioned on a center axis AX2 in a widthwise direction of the vehicle frame 20. The center axis AX2 in a widthwise direction of the vehicle frame 20 passes through a center C1 of a crankshaft of the engine 22, and the center in a widthwise direction of the tank body 40 is positioned on a vertical line passing through a center C1 of a crankshaft as viewed from the front.

The partitions 41*a*, 41*b* are disposed substantially parallel with respect to the side plates 46*a*, 46*b* and partition the inside of the tank body 40 into a number of spaces. The front ends of the partitions 41*a*, 41*b* are connected to the front plate, and the rear ends are connected to the rear plate 48. The partitions 41*a*, 41*b* are a first partition 41*a* and a second partition 41*b*, with the first partition 41*a* and the second partition 41*b* being disposed spaced from each other in a widthwise direction. The first partition 41*a* partitions a first space S1 at a center and a second space S2 on the right side of the first space S1, The second partition 41*b* partitions the first space S1 and a third space S3 on the left side of the first space S1. Large openings 17, 18 are provided at the upper half of the first partition 41*a* and the second partition 41*b* so that the first space S1 and the second space S2 communicate, and the first space S1 and the third space S3 communicate.

The hydraulic oil guide pipe 42 is provided within the tank body 40 and is a pipe that hydraulic oil returning to the hydraulic oil tank 21 passes through. The hydraulic oil guide pipe 42 has a first pipe section 36 and a second pipe section 37. A lower end of the first pipe section 36 is connected to the return port 11 of the bottom plate 45 and an upper end is connected to the filter 43. An upper end of the second pipe section 37 is connected to the filter 43 and a discharge opening 39 that discharges hydraulic oil is provided at a lower end. This discharge opening 39 is disposed in the vicinity of the bottom plate 45 in the vicinity of the first partition 41*a* within the second space S2.

The filter 43 is fitted to the inner face of the top plate 47 and cleans hydraulic oil returning to the hydraulic oil tank 21. The filter 43 is provided midway along the hydraulic oil guide pipe 42 as described above and cleans hydraulic oil passing through the hydraulic oil guide pipe 42.

The strainer 44 is fitted to the inner face of the bottom plate 45 so as to cover the inlet port 12 and cleans hydraulic oil taken in at the inlet port 12. A lower end of the strainer rod 14 is fitted to the upper face of the strainer 44 and the strainer 44 is pushed against the bottom face by the strainer rod 14. The upper end of the strainer rod 14 is fitted to the inner face of the top plate 47. The strainer 44 is provided at the first space S1 and is disposed on the center axis AX2 in a widthwise direction of the vehicle frame 20. The strainer 44 is cylindrical and a center axis of the strainer 44 and the strainer rod 14 as viewed from the front are positioned on the center axis AX2 in a widthwise direction of the vehicle frame 20.

Engine 22, Transmission 34, Torque Converter 38, Hydraulic Oil Pump 35

The engine 22 is a diesel engine. Output torque generated by the engine 22 is distributed at the transmission 34 and the hydraulic oil pump 35 and constitutes drive power when driving the working equipment 3 and when the construction vehicle 1 travels. The engine 22 is supported by the rear frame 20*b* and is disposed to the rear of the hydraulic oil tank 21.

The transmission 34 and the torque converter 38 are disposed to the front of the engine 22, and transmit drive power generated by the engine 22 to the tires 4*a*, 4*b*.

The hydraulic oil pump 35 is a variable capacity hydraulic oil pump 35 driven by output of the engine 22 and is disposed to the front of the engine 22 below the hydraulic oil tank 21.

Engine Cover 23

Figure 4:
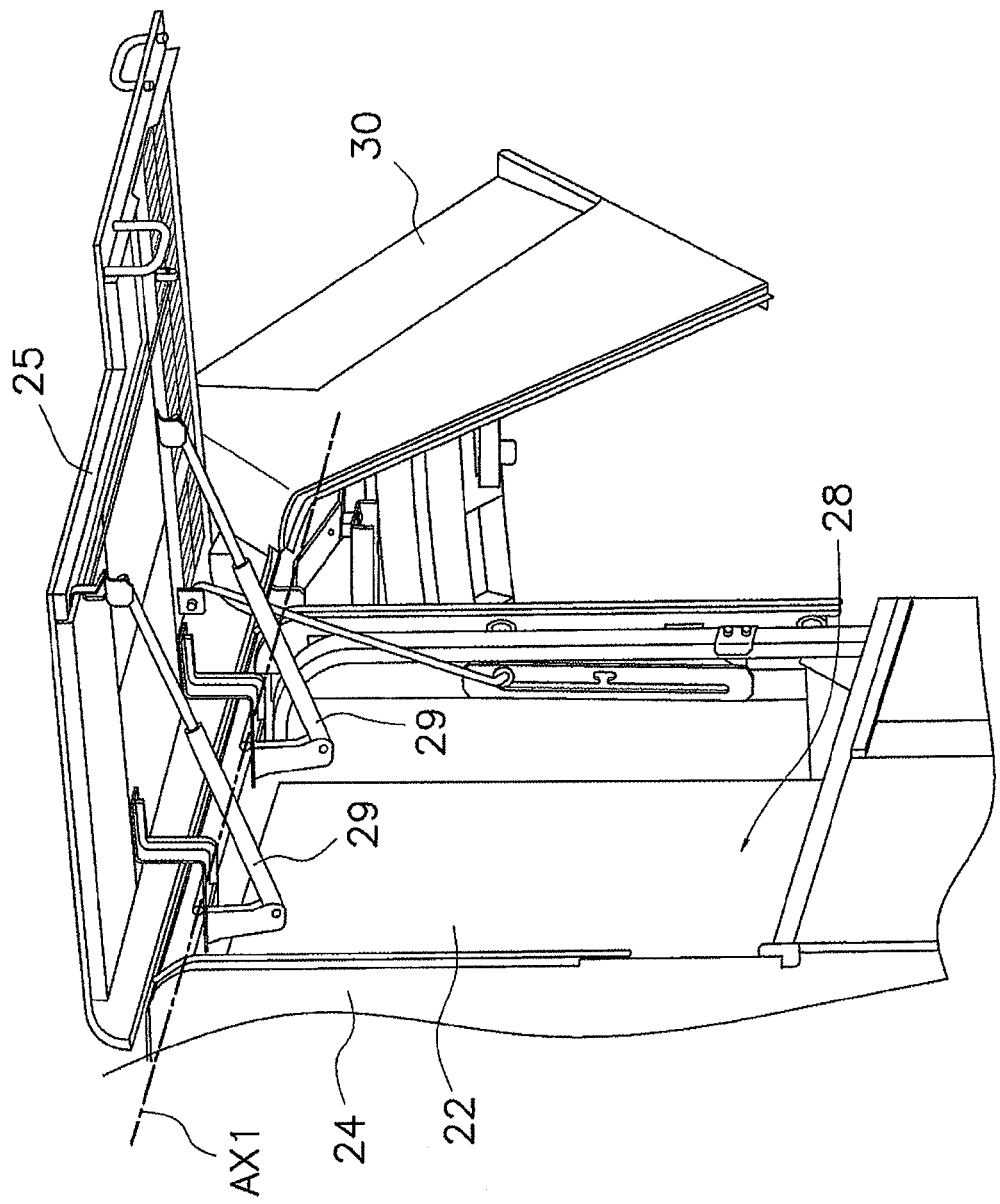
FIG. 4 is a perspective view showing an engine cover with a side cover open.

The engine cover 23 is a member covering the engine 22 and is disposed to the rear of the hydraulic oil tank 21. As shown in FIG. 4, the engine cover 23 has an engine cover body 24 and a pair of side covers 25.

The engine cover body 24 is formed from metal plates and is a member covering the engine 22. An opening 28 is provided at a position, of the side faces of the engine cover body 24, facing the engine 22. The opening 28 is provided at both side faces of the engine cover body 24. As shown in FIG. 1, the upper face of the engine cover body 24 is inclined slightly so that a rear side is positioned downwards, and the front end is substantially flush with the rear end of the upper face of the hydraulic oil tank 21. Further, the front end of the side face of the engine cover body 24 is also substantially flush with the rear ends of the side faces of the hydraulic oil tank 21.

The pair of side covers 25 are provided on both sides of the engine cover body 24 and can close the opening 28 of the side faces of the engine cover body 24. The side cover 25 for a left side face is shown in FIG. 4. The side covers 25 can open and close the opening 28 of the engine cover body 24 as a result of centrally rotating hinges provided at the upper ends of the pair of side covers 25. The upper ends of the pair of side covers 25 reach the upper face of the engine cover body 24 and are inclined with rear sides positioned downwards as with the upper face of the engine cover body 24. The pair of side covers 25 can therefore be rotated and moved centrally about a rotating axis AX1 with a rear side extending in a longitudinal direction being inclined downwards. The side covers 25 are supported by support means 29 of gas springs etc. provided within the engine cover body 24 and can be fixed at opening angles for two stages. A first stage is a state of opening at an angle smaller than 90 degrees of, for example, thirty to forty-five degrees. A second stage is the state shown in FIG. 4 and is a state of opening at ninety degrees. In this second state, the side covers 25 are substantially parallel with a horizontal face, and are positioned at substantially the same height as the upper face of the engine cover body 24.

A radiator 19 (refer to FIG. 1) and a cooling fan (not shown) for cooling the engine 22 are disposed to the rear of the engine 22 and a freely opening and closing rear cover 30 that covers the cooling fan and the radiator 19 are provided at the rear face of the engine cover 23.

Tires 4*a*, 4*b*

The tires 4*a*, 4*b* include a pair of front tires 4*a* provided at the front frame 20*a* and a pair of rear tires 4*b* provided at the rear frame 20*b* giving a total of four tires disposed at sides of lower part of the vehicle body 2. The front tires 4*a* disposed at the sides of lower part of the front frame 20*a* are positioned at a front part of the front frame 20*a*. The rear tires are provided at the sides of lower part of the rear frame 20*b* and are positioned at a central portion of the rear frame 20*b* in a direction from front to rear. The rear tires 4*b* are provided further to the rear than the operator cab 5. The tires 4*a* and 4*b* are driven at the time of traveling as a result of drive power transmitted by the engine 22 via the torque converter 38, transmission 34, and drive shaft (not shown).

Working Equipment 3

The working equipment 3 is a mechanism driven by hydraulic oil pressurized by the hydraulic oil pump 35 and has a lift arm 32 fitted to a front part of the vehicle body 2, a bucket 31 fitted to the end of this lift arm 32, a bucket cylinder 33, and an arm cylinder (not shown). The lift arm 32 is a member for lifting the bucket 31 fitted to its end. The bucket 31 is fitted to the end of the lift arm 32. The bucket cylinder 33 and the arm cylinder are hydraulic oil actuators that drive the bucket 31 and the lift arm 32 using pressurized oil discharged from the hydraulic oil pump 35.

Operator Cab 5

Figure 5:
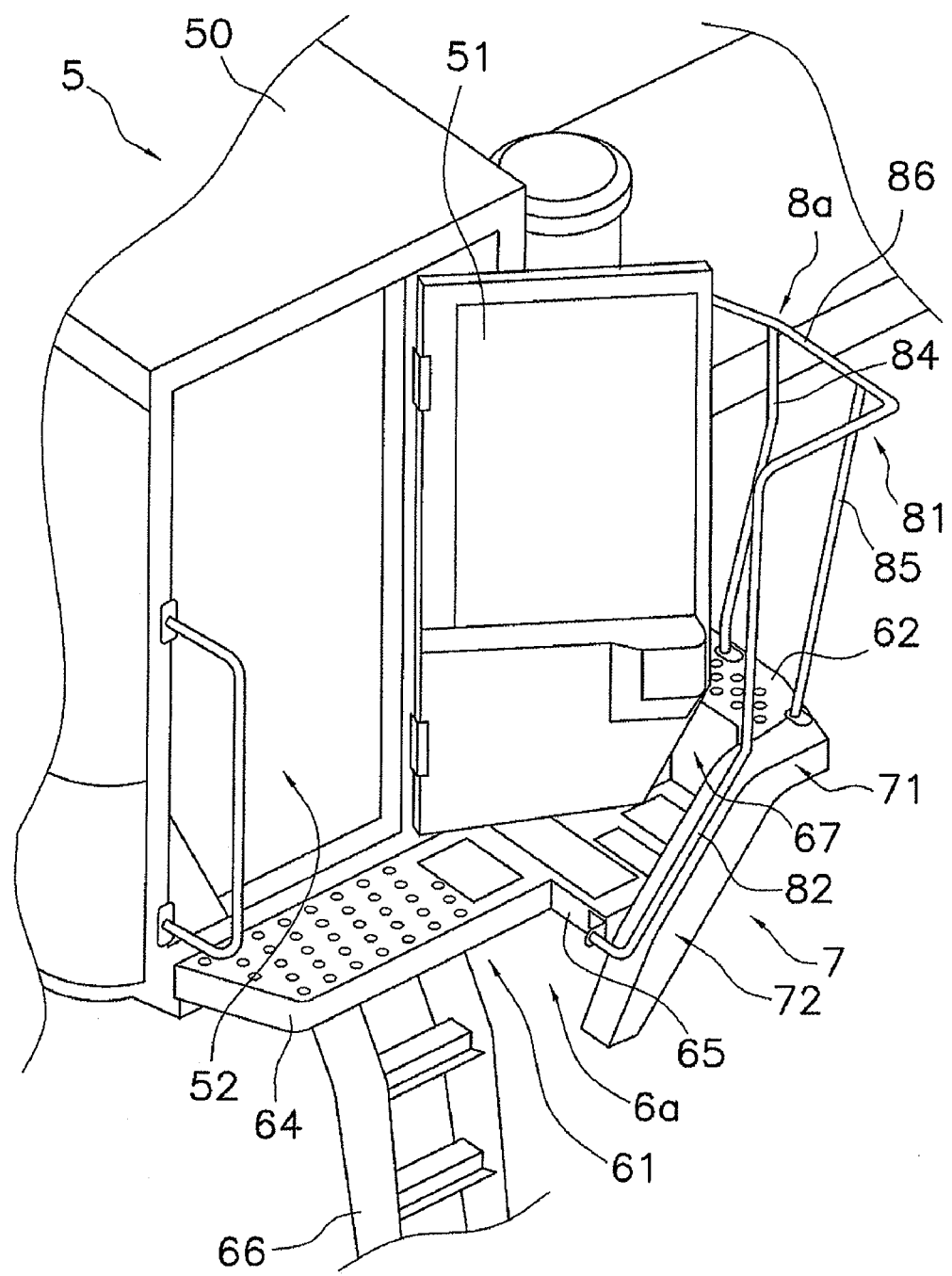
FIG. 5 is a perspective view showing a structure for a left door section, a right side step, and a left bar.
Figure 6:
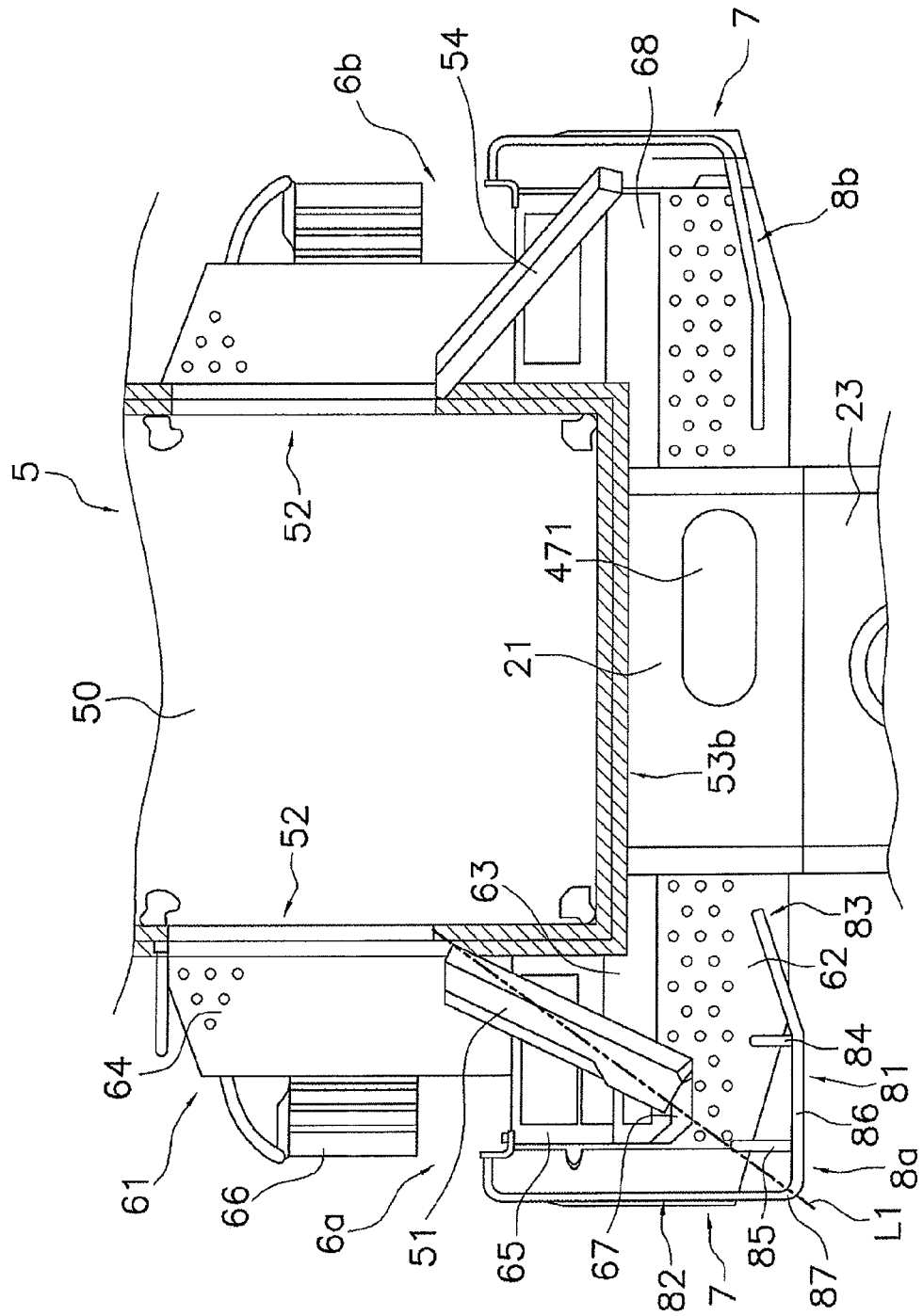
FIG. 6 is a plan view showing a positional relationship for a left door section, a left side step, and a left bar.

The operator cab 5 is mounted at an upper part of the vehicle body 2 and, as shown in FIG. 5 and FIG. 6, has an operator cab body 50, a left door section 51 and a right door section 54.

The operator cab body 50 is constructed by combining a number of steel pipes and steep plates and is substantially in the shape of a rectangular solid. Openings 52 enabling an operator to enter and exit are provided on both side faces of the operator cab body 50 and windows 53a, 53b (refer to FIG. 1) are provided at the front face and rear face of the operator cab body 50. The operator cab body 50 is mounted on the front part of the rear frame 20b and is positioned between the front tires 4a and the rear tires 4b in a direction from front to rear. The operator cab body 50 is positioned to the front of the hydraulic oil tank 21 and is larger in a widthwise direction than the hydraulic oil tank 21. A seat, operation units such as a steering wheel, and a display unit that displays various information such as speed are built into the operator cab body 50.

The left door section 51 is provided at the left side face of the operator cab body 50 and an opening 52 of the left side face of the operator cab body 50 can be opened and closed by central rotation about a hinge provided at a rear end. The left door section 51 can be opened up to an angle of approximately one hundred and fifty degrees and can be opened to a greater angle than the right door section 54, as shown in FIG. 5 and FIG. 6.

The right door section 54 is provided at the right side face of the operator cab body 50 and can be rotated centering about a hinge provided at a rear end, as with the left door section 51. The right door section 54 can be opened up to an angle of approximately one hundred and thirty-five degrees.

Air Conditioning Equipment 9

The air conditioning equipment 9 shown in FIG. 1 is equipment for carrying out air conditioning within the operator cab 5 by carrying out thermal exchange between a cooling agent and air. The air conditioning equipment 9 has an air conditioning equipment body 91 and a condenser 92. The air conditioning equipment body 91 has a compressor and heat exchanger etc., and is disposed at a storage space at a front lower part of the operator cab 5. The condenser 92 is disposed distanced from the air conditioning equipment body 91 and is electrically connected to the air conditioning equipment body 91 using a cable. The condenser 92 has a thin, plate-shaped external shape and is disposed to the front of the radiator 19.

Side Steps 6a, 6b and Fender 7

The side steps 6a, 6b shown in FIG. 5 and FIG. 6 are provided along from the side of the operator cab body 50 to the rear of the operator cab 5 and constitute footholds for the operator to get on and off the operator cab body 50. The side steps 6a, 6b, are constituted by a left side step 6a provided at the left side of the operator cab body 50 and a right side step 6b provided at the right side of the operator cab body 50. The left side step 6a and the right side step 6b are provided symmetrically so as to sandwich the operator cab body 50 therebetween.

The left side step 6a has a first step section 61 positioned at the side of the opening 52 of the operator cab body 50, a second step section 62 positioned to the rear of the first step section 61 above the first step, and a stepped section 63 connecting the first step section 61 and the second step section 62.

The first step section 61 is provided in a longitudinal direction along the opening 52 of the operator cab body 50 and has a substantially horizontal upper face. The first step section 61 has a front section 64 that is smaller in a widthwise direction than the fender 7 described later, and a rear section 65, connected to a rear end of the front section 64, that is wider in a widthwise direction than the front section 64. The front section 64 is provided in a longitudinal direction from a front end of a side face of the operator cab body 50 to a position where a hinge for the left door section 51 is provided, i.e. to a position slightly to the rear of a rear end of the opening 52. A ladder section 66 extending downwards from the lower face of the front section 64 is provided at a side end of the front section 64. The rear section 65 is provided in a longitudinal direction from the vicinity of a hinge of the left door section 51 to the rear end of the left side face of the operator cab body 50. Arrangement is such that the fender 7 overlaps in the vicinity of the rear end of the left side face of the operator cab body 50 when viewed from the side. However, an internal portion of the fender 7 is formed so as to be collapsible to the rear and the rear section 65 is then disposed at this collapsible portion.

The second step section 62 is provided at an upper face of the fender 7 and is substantially horizontal. The second step section 62 is positioned above the first step section 61 and is positioned to the rear of the rear section 65 of the first step section 61. The second step section 62 is provided from the left side face of the hydraulic oil tank 21 provided to the rear of the operator cab body 50 to the left side end of the rear section 65. The right side end of the second step section 62 is then positioned to the rear of the operator cab body 50 because the hydraulic oil tank 21 is smaller in a widthwise direction than the operator cab body 50. The rear end of the second step section 62 is given an inclined shape so as to be positioned to the front, i.e. further to the outside than the left side end side.

The stepped section 63 connects the rear end of the first step section 61 and the front end of the second step section 62 and is assembled on the first step section 61. A recess 67 recessed in a direction towards the rear is provided in the vicinity of the left side end of the stepped section 63. The position where the recess 67 is provided is a position the end of the left door section 51 collides with when fully open.

The right side step 6b has substantially the same structure as the left side step 6a but a recess such as the recess 67 of the left side step 6a is not provided for a stepped section 68 of the right side step 6b.

The fender 7 is a member that covers the rear tires 4b in order to prevent dirt from splashing up from the rear tires 4b.

The fenders 7 are provided on both sides of the vehicle body 2 and project sideways from the sides of the vehicle body 2. The fenders are formed not to completely cover above the rear tires 4b but rather to cover only the upper front side of the rear tires 4b. As shown in FIG. 5, the fender 7 has a horizontal section 71 with an upper face provided substantially horizontally and an inclined section 72 inclined so that a front side is positioned downwards when viewed from the side. The second step section 62 described above is provided on the upper face of the horizontal section 71. The rear end of the inclined section 72 is connected to the front end of the horizontal section 71 and the rear section 65 and the stepped section 63 described above are provided at the inside of the inclined section 72.

Bars 8a, 8b

The bars 8a, 8b are members for preventing falling off of the side steps 6a, 6b and are assembled on the upper side face of the fender 7. A left bar 8a provided on the fender 7 on the left side and a right bar 8b (refer to FIG. 6) provided on the fender 7 on the right side are the bars 8a, 8b.

The left bar 8a has a first bar 81 provided on the upper face of the horizontal section 71 of the fender 7, i.e. on the second step section 62, and a second bar 82 provided on the upper side face of the inclined section 72.

Figure 7:
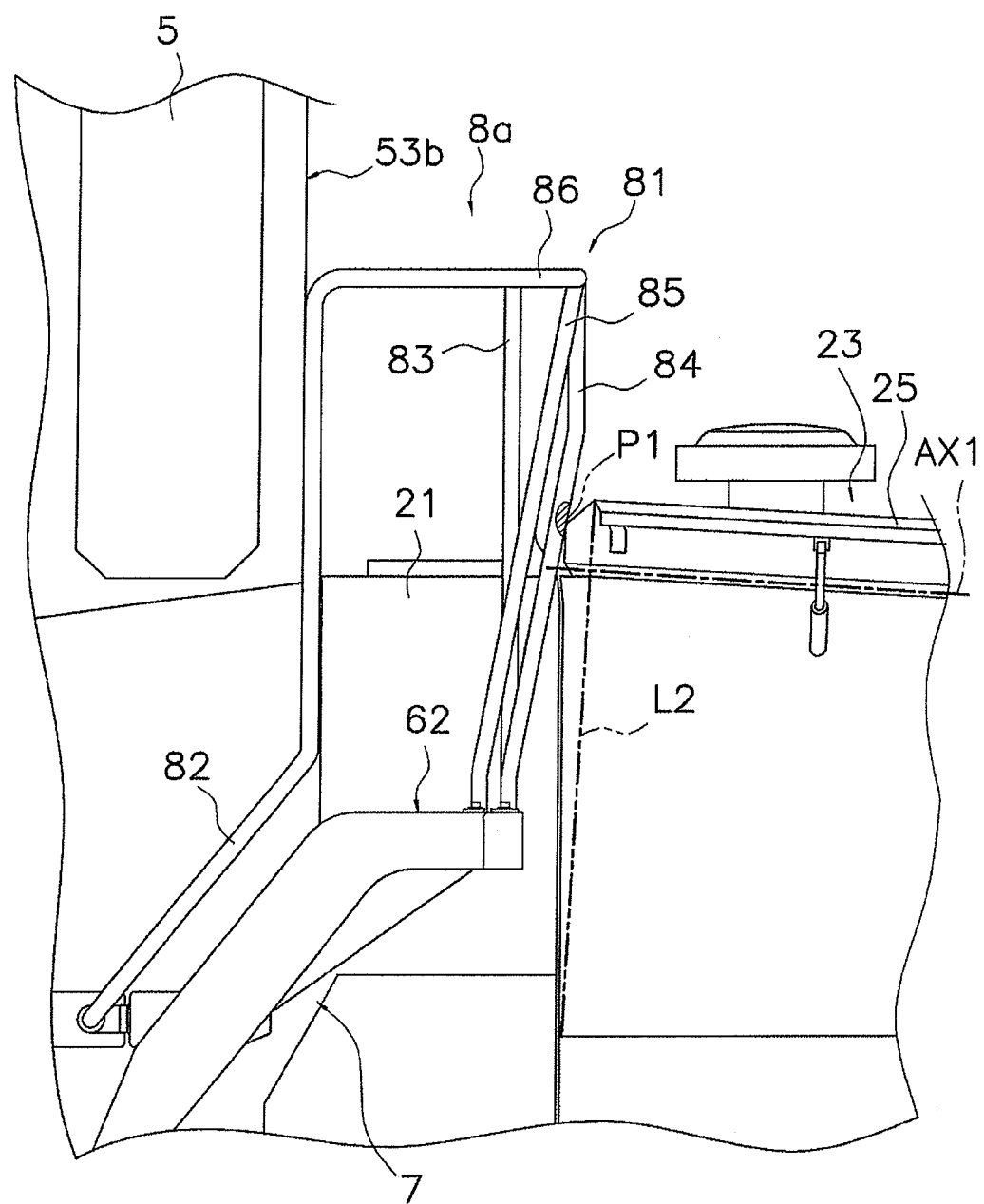
FIG. 7 is a left side view showing a positional relationship for a side cover and a first bar.

The first bar 81 is provided behind the rear end of the left door section 51 in a completely open state along to the rear end of the second step section 62. The first bar 81 has a first column 83, a second column 84, a third column 85, and a hand rail 86 linking the upper ends of the first column 83, the second column 84 and the third column 85. The first column 83, the second column 84, and the third column 85 are disposed in order spaced in a widthwise direction along to the rear end of the second step section 62, and the first column 83 is disposed to the rightmost side, i.e. at the side of the hydraulic oil tank 21. As shown in FIG. 7, the first column 83 is a straight pipe member parallel with a vertical direction. The second column 84 and the third column 85 are positioned to the outside of the first column 83, i.e. to the left of the first column 83. The second column 84 and the third column 85 have upper ends inclined to the rear. The lower end of the second column 84 is therefore at the same position as the first column 83 when viewed from the side and therefore overlap in a longitudinal direction. However, the upper end of the second column 84 is positioned further to the rear than the upper end of the first column 83. Further, the lower end of the third column 85 is positioned further to the front than the second column 84 and the first column 83 in a longitudinal direction. However, the upper end of the third column 85 is positioned further to the rear than the upper end of the first column 83 and is positioned at the same position as the upper end of the second column 84. The upper end of the second column 84 and the upper end of the third column 85 are positioned further to the rear than the rear end of the second step section 62 and are positioned further to the rear than the rear end of the fender 7.

The second bar 82 is positioned to the side of the end of the left door section 51 when completely open and is provided along the side end of the left side step 6a on the left side step 6a. More specifically, the second bar 82 is provided along the upper side face of the inclined section 72 of the fender 7 and the left side end of the upper face of the horizontal section 71. As shown in FIG. 6, when viewed from above, the second bar 82 makes an angle of substantially ninety degrees with the first bar 81, and the rear end of the second bar 82 is connected to the left side end of the hand rail 86 of the first bar 81.

The right bar 8b has a similar structure to the left bar 8a but differs from the left bar 8a in that all of a number of columns provided along the rear end of the right side step 6b are in the shape of a straight line parallel with a vertical direction.

Positional Relationship of the Left Door Section 51 and the Left Bar 8a

Next, a detailed description is given based on FIG. 6 of the positional relationship of the left door section 51 and the left bar 8a that is a feature of the invention of this application.

The left door section 51 can be opened as far as a virtual line L1 linking a bent section 87 linking the first bar 81 and the second bar 82 and a hinge of the left door section 51. When the left door section 51 is opened as far as possible, the end of the left door section 51 is adjacent to or is positioned on the virtual line L1 linking the bent section 87 and the hinge of the left door section 51. In this state, an end of the left door section 51 collides with the recess 67 and opening beyond this point is not possible.

Further, in the above state, a space of an order capable of allowing an operator to pass is maintained between the end of the left door section 51 and the second bar 82. Moreover, the end of the left door section 51 is positioned to the front between the second column 84 and the third column 85 of the first bar 81. However, a gap of an order capable of allowing an operator to pass is ensured between the end of the left door section 51 and the first bar 81 as a result of the second column 84 and the third column 85 being inclined to the rear.

The end of the left door section 51 is adjacent to the second bar 82 in a state where the left door section 51 is open to ninety degrees or to slightly more than ninety degrees. In this state, a slight gap is maintained between the end of the left door section 51 and the second bar 82. The left door section 51 can therefore be opened without interfering with the second bar 82 or the fender 7 as was the case with items where the operator could not pass.

Positional Relationship of the Side Cover 25 and the First Bar 81

Next, a detailed description is given based on FIG. 7 of the positional relationship of the side cover 25 and the first bar 81.

The second step section 62 is positioned to the left side of the hydraulic oil tank 21 further to the front than the engine cover 23. A moveable space that moves during opening and closing of the side cover 25 is therefore positioned to the rear of the first bar 81 provided on the second step section 62. There is therefore the fear that the first bar 81 will interfere with the side cover 25 when the extent of inclination to the rear of the first bar 81 is substantial. The positional relationship of side cover 25 and the first bar 81 is therefore as described in the following in order to prevent interference between the side cover 25 and the first bar 81 at the construction vehicle 1.

As with the upper face of the engine cover body 24, rotating axis AX1 of the side cover 25 is inclined so that the rear side is positioned downwards. When the side cover 25 is then rotated, the front end of the side cover 25 moves along a locus L2 (refer to dotted and dashed line of FIG. 7) inclined so that the upper end side is positioned to the rear when viewed from the side. The inclination of the locus L2 of the front end of the side cover 25 is in the same direction as the inclination of the second column 84 and the third column 85 of the first bar 81 and interference between the side cover 25 and the first bar 81 therefore becomes difficult.

The portion P1 facing the side cover 25 in an open state of the first bar 81 is positioned at the same position as the front end of the pair of side covers 25 in a closed state or slightly to the rear, in a longitudinal direction. Namely, the front end of the side cover 25 is positioned in such a manner that there is interference when moved in a vertical direction. However, when the portion P1 of the first bar 81 facing the side covers 25 moves along the locus L2 and a completely open state is reached, the portion P1 is positioned to the front from the front end of the over 25 and a gap is ensured with the side cover 25. The first bar 81 can therefore be positioned as far as possible to the rear within a range where there is no interference with the side cover 25.

Figure 8:
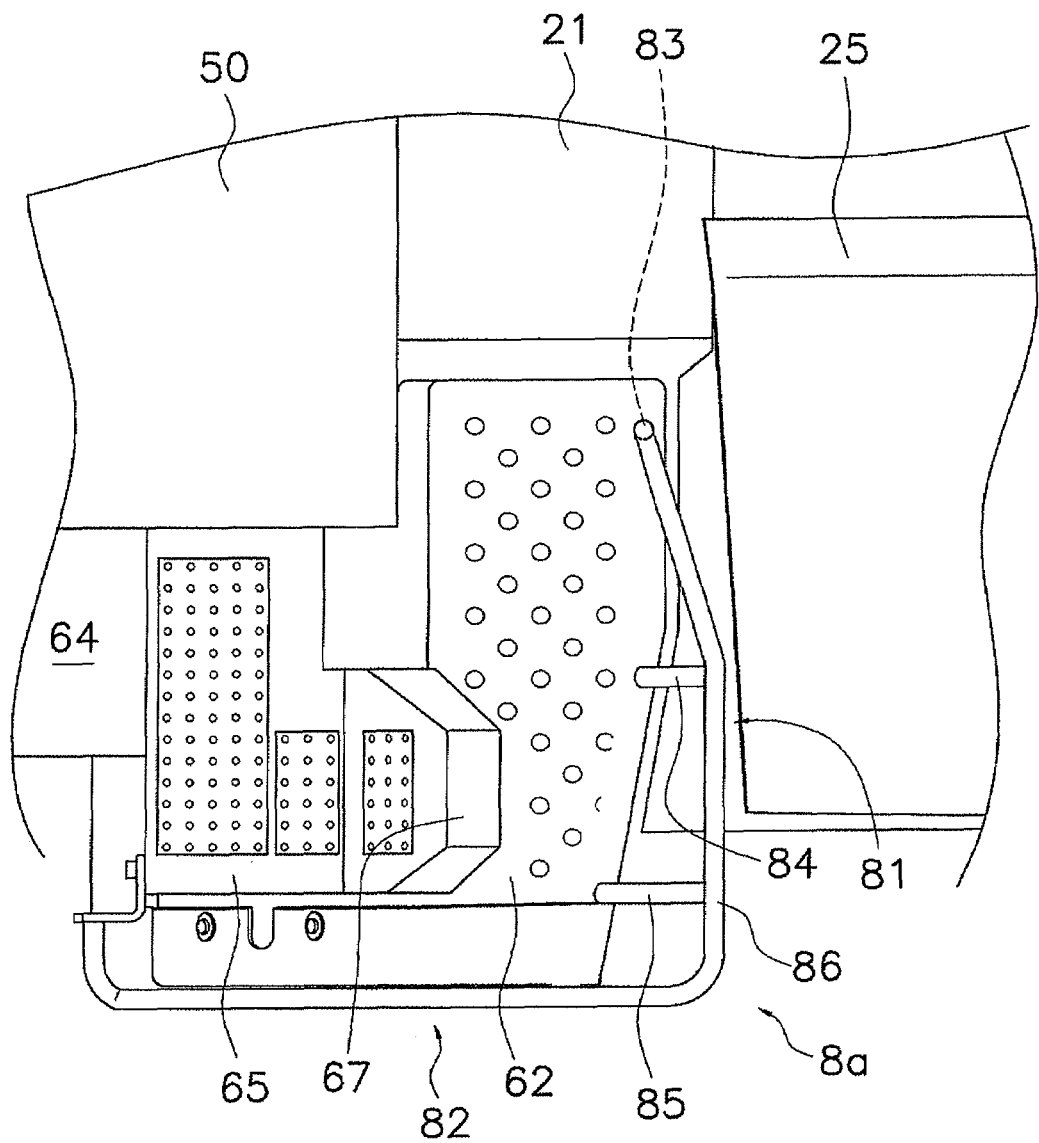
FIG. 8 is a plan view showing a positional relationship for the side cover and the first bar.
Figure 1:
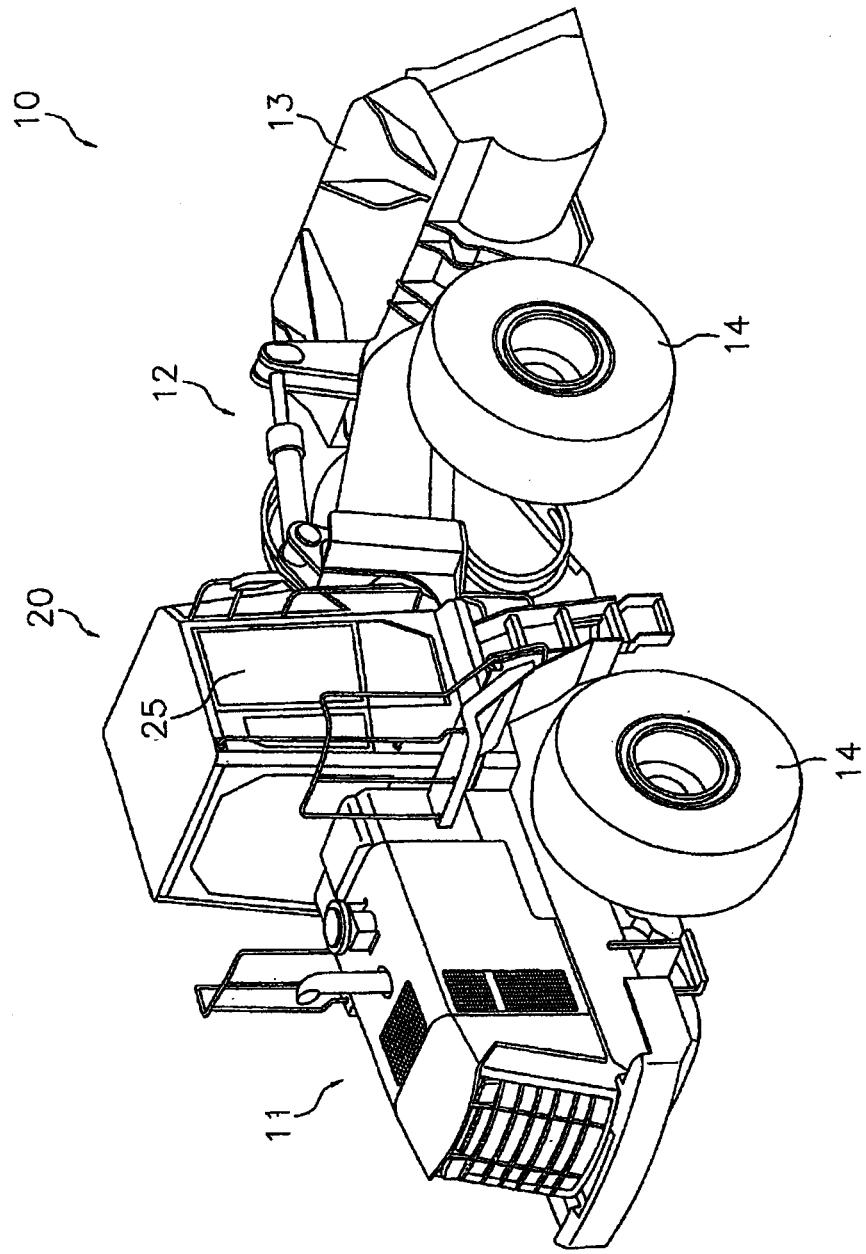
Figure 2:
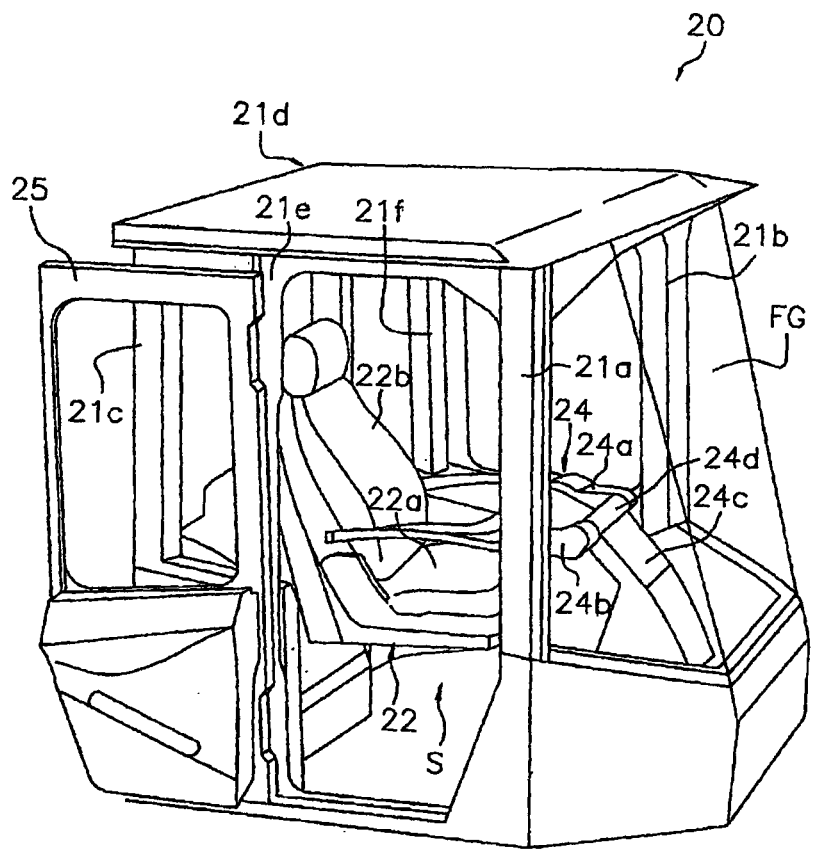
Figure 3:
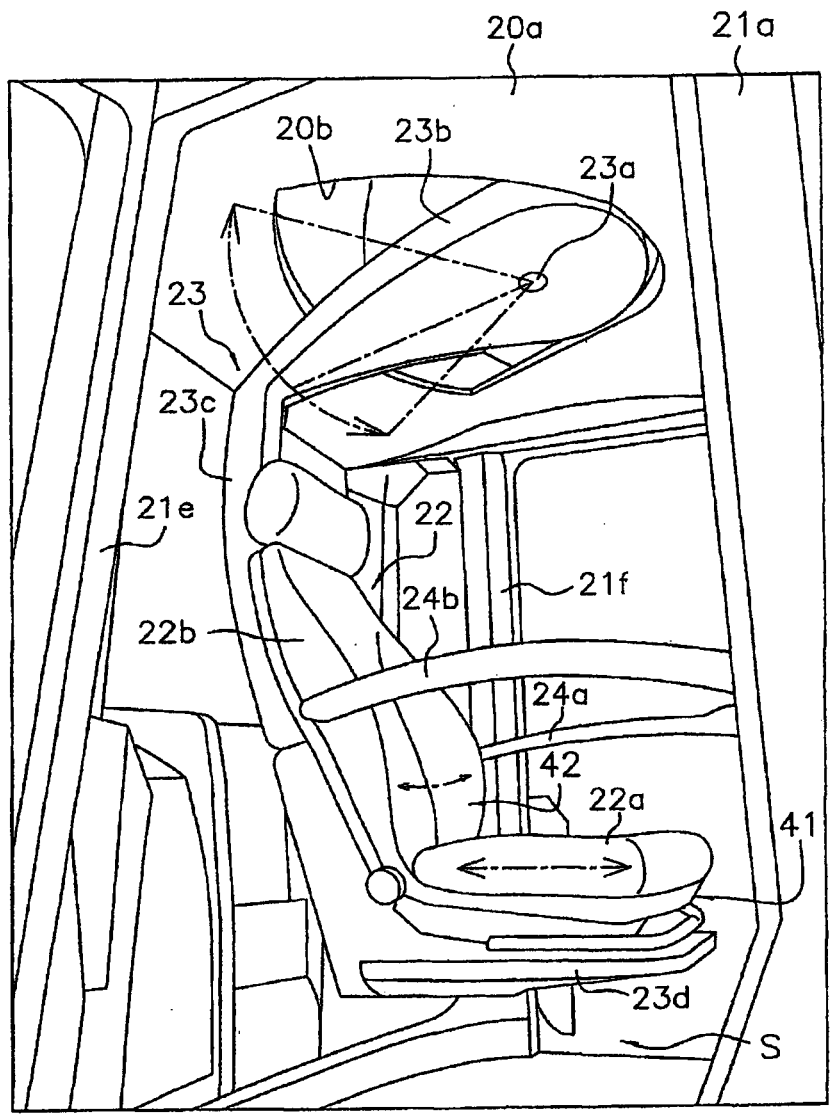
Figure 4:
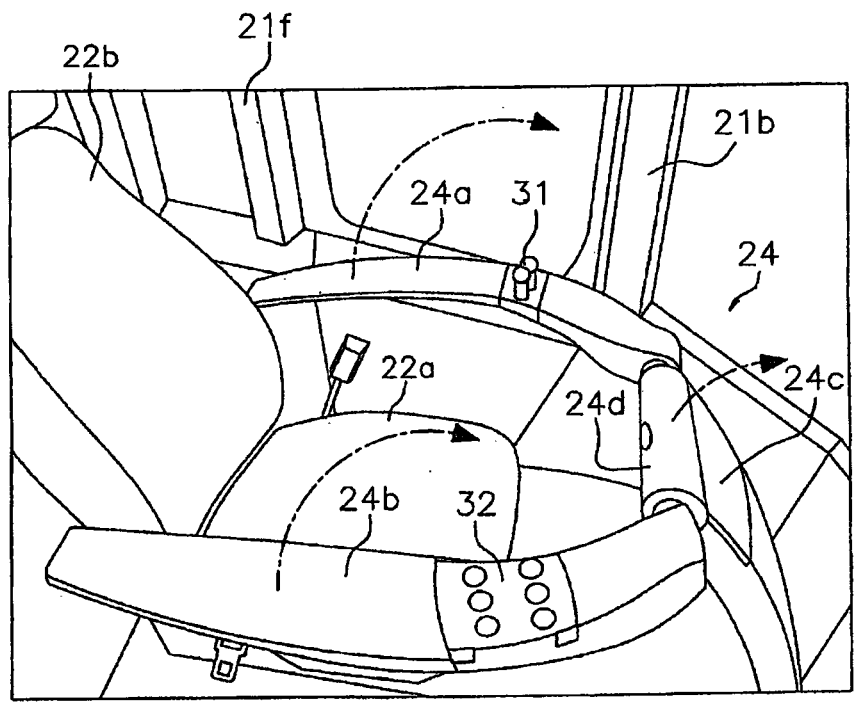
Figure 5:
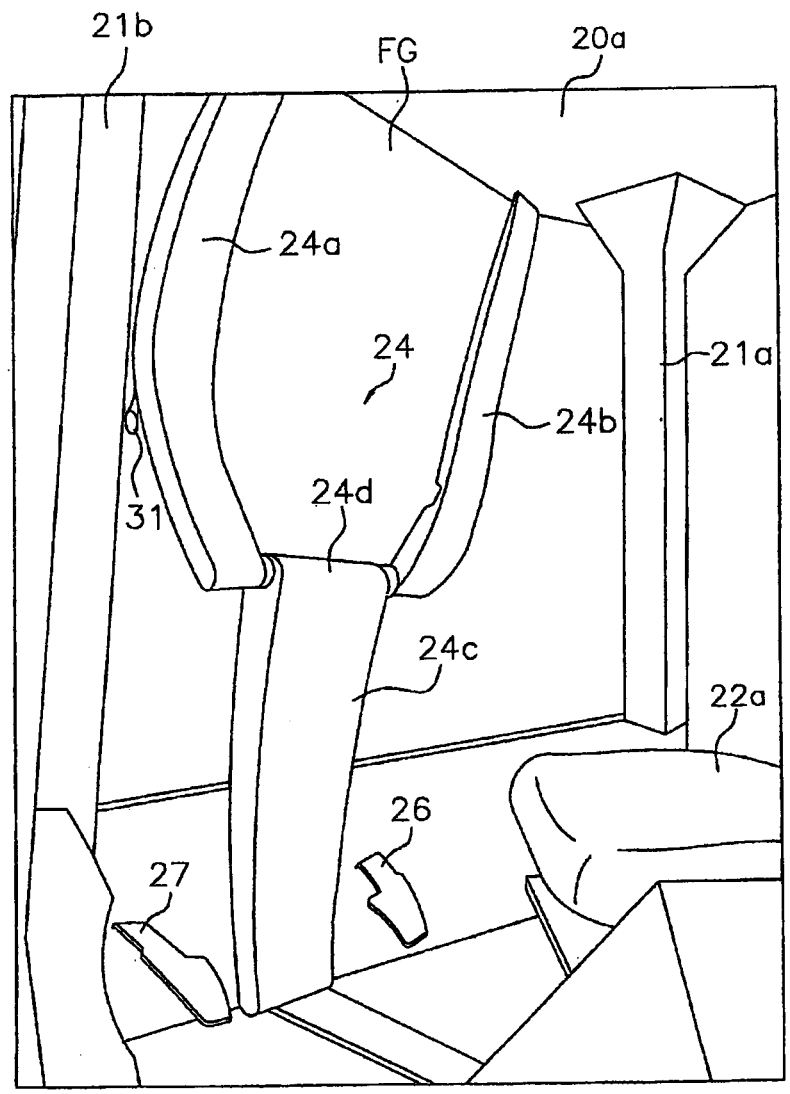
Figure 6:
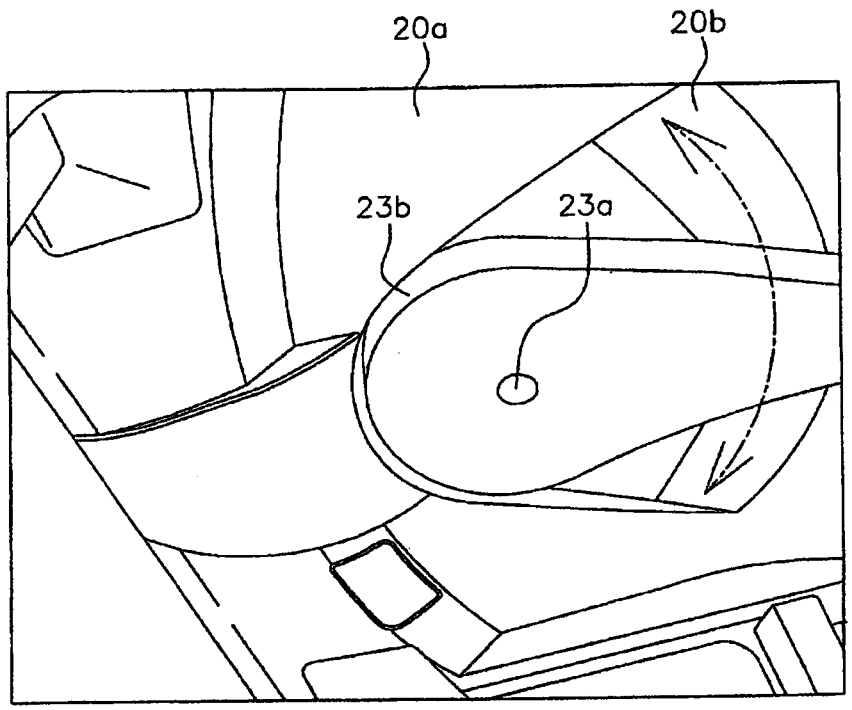
Figure 7:
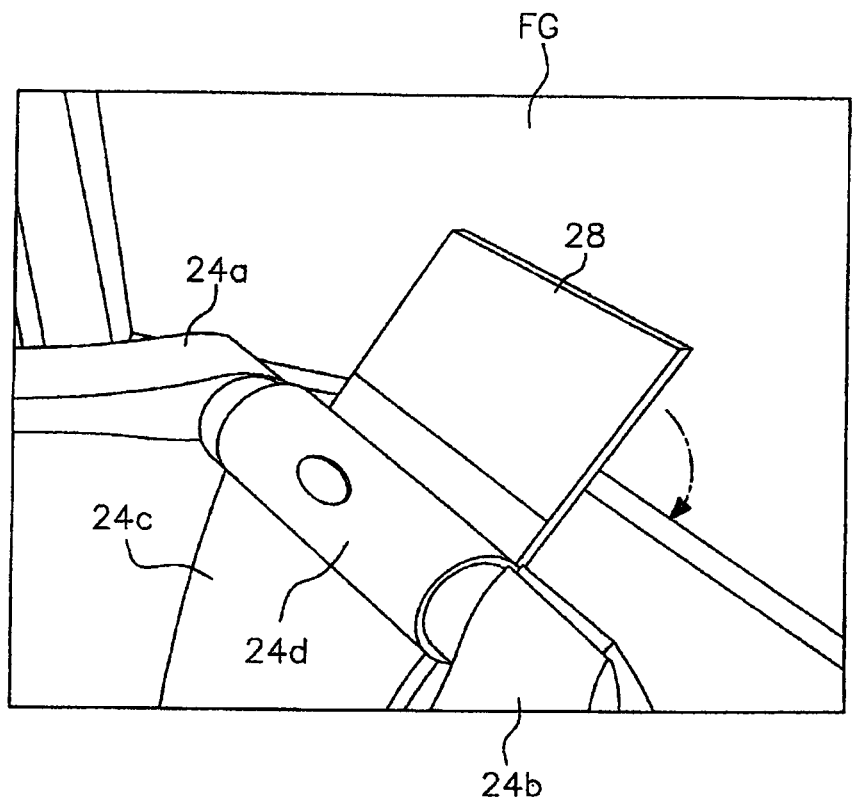
Figure 8:
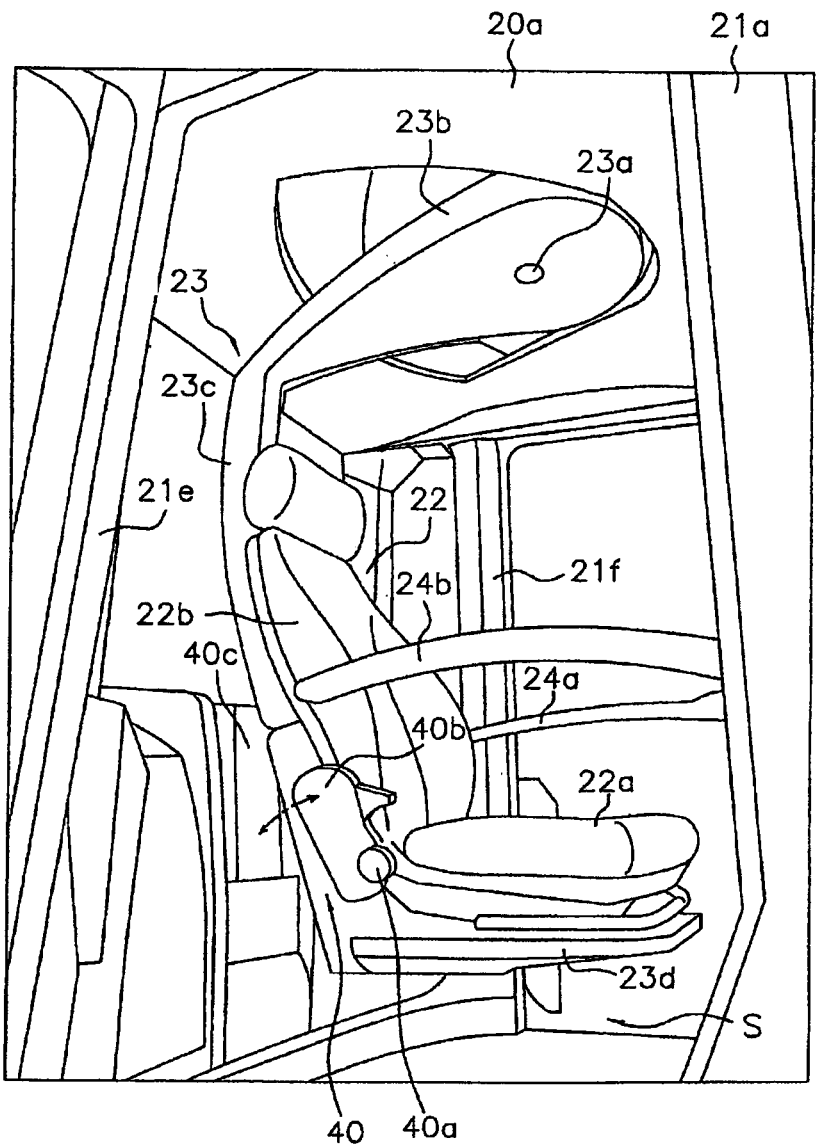

Further, as shown in FIG. 8, the front end of the side cover 25 is inclined so as to be positioned further to the rear than the end side of the side cover 25 as viewed from above in a state where the side cover 25 is completely opened. Namely, the portion of the front end of the side cover 25 facing the second column 84 and the third column 85 is positioned comparatively to the rear. This means that interference with the front end of the side cover 25 is difficult even if the second column 84 and the third column 85 are inclined to the rear. The portion, of the front end of the side cover 25, facing the first column 83 is positioned comparatively to the front but the first column 83 is not shaped so as to be inclined to the rear and interference is therefore avoided.

(1) With this construction vehicle 1 there is no externally fitted cover that covers the hydraulic oil tank 21. Moreover, the upper face and side faces of the hydraulic oil tank 21 are exposed to outside because the hydraulic oil tank 21 is disposed between the operator cab 5 and the engine cover 23. The extent to which the hydraulic oil is cooled can therefore be increased. It is also possible for the effects of cooling to be substantially increased during travel because the construction vehicle 1 is a wheel loader capable of high-speed travel.

(2) With this construction vehicle, the upper face and side faces of the hydraulic oil tank 21 are provided flush with the upper face and the side faces of the engine cover 23 disposed to the rear. The external faces of the hydraulic oil tank 21 and the engine cover 23 are therefore flush with each other. This means that degradation of the external appearance is small even if the upper face and side faces of the hydraulic oil tank 21 are exposed to the outside. This suppresses lowering of overall attractiveness.

An externally fitting cover that covers the hydraulic oil tank 21 is not provided with this construction vehicle 1 and the external faces of the hydraulic oil tank 21 therefore also constitute the exterior. Increases in the number of parts can therefore be suppressed and manufacturing costs can be reduced.

(3) With this construction vehicle 1, the hydraulic oil tank 21 is loaded on the vehicle frame 20 with the center in the widthwise direction of the hydraulic oil tank 21 positioned on the center axis AX2 in a widthwise direction of the vehicle frame 20. Weight distribution is therefore improved.

(4) With this construction vehicle 1, it is possible to connect the hydraulic oil piping 13 disposed within the vehicle frame 20 to the lower face of the hydraulic oil tank 21 without being exposed to outside because the hydraulic oil tank 21 is mounted on the vehicle frame 20. The attractiveness of the construction vehicle 1 can therefore be improved because the hydraulic oil piping 13 does not affect the external appearance.

(5) At the construction vehicle 1, of the parts of the air conditioning equipment 9, the comparatively large condenser 92 is disposed to the front of the radiator 19 spaced away from the air conditioning equipment body 91. The air conditioning equipment body 91 is disposed at a storage space at a front lower part of the operator cab 5. It is therefore possible to keep the external shape from becoming large and to dispose the hydraulic oil tank 21 to the rear of the operator cab 5.

(6) With this construction vehicle 1, the strainer 44 disposed within the hydraulic oil tank 21 is positioned on the center axis AX2 in a widthwise direction of the vehicle frame 20. It is then possible to suppress the detrimental influence of hydraulic oil being taken in from the strainer 44 when the vehicle frame 20 is inclined. It is therefore possible to stably provide hydraulic oil from the hydraulic oil tank 21 with this construction vehicle 1.

Further Embodiments (1) In the above embodiment, the hydraulic oil piping 13 is connected to the lower face of the hydraulic oil tank 21. However, it is also possible to provide the hydraulic oil piping 13 without degrading the external appearance of the construction vehicle 1 even when connected to the front face or the rear face of the hydraulic oil tank 21.

(2) In the above embodiments, the invention of this application is applied to a wheel loader but is also applicable to other construction vehicles. However, the effects of cooling the hydraulic oil are more substantial in the case of application to wheel loaders capable of high-speed travel.

The invention of this application is capable of increasing the effect of cooling hydraulic oil stored in a hydraulic oil tank and suppressing degradation of attractiveness and is therefore useful for construction vehicles.

The invention claimed is:

1. An operator seat for a construction machine disposed in a cab of the construction machine, the operator seat comprising:
    a seat portion that includes a seat section on which an operator sits, and a backrest section that is mounted to the seat section in a direction that intersects the seat section;
    a hanging portion connecting a part of the seat portion to a ceiling surface of the cab to suspend the seat portion from above; and
    a rotation mechanism that allows the seat portion to rotate about a rotation axis in a substantially horizontal direction, the rotation axis being disposed at a connecting part between the part of the seat portion and the ceiling surface of the cab.

2. The operator seat for a construction machine according to claim 1, further comprising
    a slide mechanism that allows the seat section of the seat portion to slide frontward and rearward relative to the hanging portion.

3. The operator seat for a construction machine according to claim 1, further comprising
    an angle adjustment mechanism that adjusts an angle of the backrest section of the seat portion with respect to the seat section.

4. The operator seat for a construction machine according to claim 1, wherein
    the hanging portion includes a protection structure that extends from a ceiling part of the cab to a connection part between the hanging portion and the seat portion to protect an operator's head.

5. A cab for a construction machine comprising:
    the operator seat for a construction machine according to claim 1; and
    a door that is disposed in a side portion of the operator seat.

6. The cab for a construction machine according to claim 5, further comprising an operation portion disposed in front of the seat portion with the operation portion being tiltable upward and downward.

7. The cab for a construction machine according to claim 6, wherein the operation portion includes an arm section that includes an operation part configured and arranged to be operated by the operator, and a support section that supports the arm section, both the arm section and the support section being tiltable upward and downward.

8. A construction machine comprising the cab for a construction machine according to claim 5.

9. An operator seat for a construction machine disposed in a cab of the construction machine, the operator seat comprising:

a seat portion that includes a seat section on which an operator sits, and a backrest section that is mounted to the seat section in a direction that intersects the seat section;

a hanging portion connecting a part of the seat portion to a ceiling surface of the cab to suspend the seat portion from above;

a rotation mechanism that allows the seat portion to rotate in a substantially horizontal direction; and a rotation locking mechanism that selectively restricts a rotation of the seat portion and selectively releases the restriction.

10. An operator seat for a construction machine disposed in a cab of the construction machine, the operator seat comprising:

a seat portion that includes a seat section on which an operator sits, and a backrest section that is mounted to the seat section in a direction that intersects the seat section; and a hanging portion connecting a part of the seat portion to a ceiling surface of the cab to suspend the seat portion from above with the hanging portion including a protection structure that substantially prohibits a vertical movement of the seat portion with respect to the ceiling surface.

\* \* \* \* \*

UNITED STATES PATENT AND TRADEMARK OFFICE
CERTIFICATE OF CORRECTION

| | | |
|---|---|---|
| PATENT NO. | : 7,654,601 B2 | |
| APPLICATION NO. | : 12/119247 | |
| DATED | : February 2, 2010 | |
| INVENTOR(S) | : Spellmeyer et al. | |

It is certified that error appears in the above-identified patent and that said Letters Patent is hereby corrected as shown below:

Please delete the patent in its entirety and replace with the new Title page, Drawings, and specification, claims as attached.

Signed and Sealed this
Seventh Day of June, 2011

David J. Kappos
*Director of the United States Patent and Trademark Office*

(12) United States Patent
Spellmeyer et al.

(10) Patent No.: US 7,654,601 B2
(45) Date of Patent: Feb. 2, 2010

(54) OPERATOR SEAT FOR CONSTRUCTION MACHINE, AND CAB AND CONSTRUCTION MACHINE INCLUDING THE SAME

(75) Inventors: Gunnar Spellmeyer, Hannover (DE); Birgit Weller, Hannover (DE); Jonas Claudy, Hannover (DE); Simon Hellwig, Hannover (DE); Jan Henemann, Hannover (DE); Christian Grajewski, Rittergut Esbeck (DE); Florian Kristen, Hannover (DE); Christian Schuschan, Langenhagen (DE); Christoph Pröβler, Hannover (DE); Felix Runde, Hannover (DE)

(73) Assignee: Komatsu Ltd., Tokyo (JP)

( * ) Notice: Subject to any disclaimer, the term of this patent is extended or adjusted under 35 U.S.C. 154(b) by 25 days.

(21) Appl. No.: 12/119,247

(22) Filed: May 12, 2008

(65) Prior Publication Data
US 2008/0290694 A1    Nov. 27, 2008

(30) Foreign Application Priority Data
May 21, 2007   (DE) ............... 10 2007 023 568

(51) Int. Cl.
*B60N 2/14* (2006.01)
(52) U.S. Cl. ................... 296/65.06; 296/68.1
(58) Field of Classification Search ............ 296/63, 296/65.01, 68.1, 65.05–65.07, 190.01, 190.03; 297/344.21, 344.22, 344.23; 244/118.5, 244/118.6
See application file for complete search history.

(56) References Cited

U.S. PATENT DOCUMENTS

| | | | | |
|---|---|---|---|---|
| 2,389,852 | A * | 11/1945 | Hagner | 33/268 |
| 2,606,727 | A * | 8/1952 | De Haven | 244/118.6 |
| 3,591,234 | A * | 7/1971 | Condon | 297/344.2 |
| 3,630,566 | A * | 12/1971 | Barecki | 296/63 |
| 3,922,029 | A * | 11/1975 | Urai | 296/68.1 |
| 3,986,748 | A * | 10/1976 | Magnuson | 296/65.02 |
| 4,026,379 | A * | 5/1977 | Dunn et al. | 180/331 |
| 4,474,347 | A * | 10/1984 | Mazelsky | 244/122 R |
| 5,016,722 | A * | 5/1991 | Morita et al. | 180/89.14 |
| 6,409,243 | B1 * | 6/2002 | Hansen | 296/68.1 |
| 6,663,173 | B1 * | 12/2003 | Corfitsen | 297/62 |
| 6,805,033 | B2 * | 10/2004 | Mauthe et al. | 89/36.01 |
| 6,814,174 | B2 * | 11/2004 | Fluent et al. | 180/329 |
| 7,059,680 | B2 * | 6/2006 | Billger et al. | 297/344.22 |
| 7,121,608 | B2 * | 10/2006 | Billger et al. | 296/65.06 |
| 7,229,118 | B2 * | 6/2007 | Saberan et al. | 296/65.01 |
| 7,270,371 | B2 * | 9/2007 | Adragna et al. | 297/14 |
| 7,506,918 | B2 * | 3/2009 | Magni | 296/190.08 |
| 7,513,558 | B2 * | 4/2009 | Hansen | 296/68.1 |
| 2003/0230447 | A1 | 12/2003 | Wulfert et al. | |
| 2009/0015049 | A1 * | 1/2009 | Kanamori et al. | 297/340 |

FOREIGN PATENT DOCUMENTS

| | | |
|---|---|---|
| DE | 195 32 025 A1 | 3/1997 |
| DE | 698 00 869 T2 | 2/2002 |
| EP | 1 582 635 A2 | 10/2005 |
| JP | 2000-168499 A | 6/2000 |
| WO | WO-98/41419 | 9/1998 |

* cited by examiner

*Primary Examiner* — Glenn Dayoan
*Assistant Examiner* — Gregory Blankenship
(74) *Attorney, Agent, or Firm* — Global IP Counselors

(57) ABSTRACT

An operator seat of a construction machine is disposed in a cab of the construction machine, and includes a seat portion having a seat section on which an operator sits, and a backrest section. The operator seat further includes a hanging portion connecting a part of the seat portion to a ceiling surface of the cab to suspend the seat portion from above.

10 Claims, 10 Drawing Sheets

OPERATOR SEAT FOR CONSTRUCTION MACHINE, AND CAB AND CONSTRUCTION MACHINE INCLUDING THE SAME

CROSS-REFERENCE TO RELATED APPLICATIONS

This application claims priority to D.E. Patent Application No. 10 2007 023 568. 4-16, filed on May 21, 2007.

BACKGROUND OF THE INVENTION

The present invention relates to an operator seat that is disposed in a construction machine, such as a wheel loader, and a cab and a construction machine that include this seat.

Conventionally, a construction machine such as a wheel loader is provided with a cab. The cab includes a compartment that is formed by walls that includes a stepping into/off door and windows and encloses an operator seat, and is provided with a working machine operation device, a traveling control device, and so on.

For example, Japanese Patent Laid-Open Publication TOKUKAI No. 2000-168499 discloses an operator seat device for a construction machine that includes a seat portion, a backrest portion, an arm rest portion, and so on and is mounted on a seat support that is secured on a floor of a cab.

However, the aforementioned known cab for a construction machine has the following problem.

In recent years, in order to protect operators in cabs in rollover accidents of construction machines, ROPS (Rollover Protective Structure) of a cab is used. Nevertheless, in case that unpredictable shock hits a ceiling surface or the like of a cab, the structure of the aforementioned operator seat device for a construction machine disclosed in Patent Document 1 may have possibility not to provide more sufficient space above operator's head. The reason is that the seat portion and so on are mounted on the seat support that stands on the floor.

The object of the present invention is to provide an operator seat for a construction machine capable of providing more sufficient space above the head of an operator in a cab, and a cab and a construction machine that include this seat.

SUMMARY OF THE INVENTION

An operator seat for a construction machine according to a first aspect of the present invention is disposed in a cab of the construction machine and includes a seat portion, and a hanging portion. The seat portion includes a seat section, and a backrest section. An operator sits on the seat section. The backrest section is mounted to the seat section, preferably to the rear thereof, in a direction that intersects the seat section. The hanging portion connects a part of the seat portion to a ceiling surface of the cab to suspend the seat portion from above.

In this configuration, a hanging-from-above system that hangs the operator seat from the ceiling surface of the cab is used for the operator seat that is disposed in the cab of the construction machine.

The hanging-from-above system for an operator seat referred herein includes a system that hangs an operator seat from a ceiling surface, differing from a conventional support system that mounts an operator seat on a support section that stands on a floor of a cab. The hanging portion that is mounted to the ceiling surface can support a part of the backrest section of the operator seat, or can support the seat section. Types of the construction machines that are provided with the operator seat according to the present invention are a wheel loader, a bulldozer, a hydraulic excavator, a motor grader, and so on.

In this configuration, it is possible to provide space between the bottom of the operator seat and the floor of the cab. Accordingly, even in case that the ceiling surface is damaged due to a load applied onto the ceiling surface, the operator seat can move to the height corresponding to the floor, therefore, it is possible to provide more sufficient space above operator's head as compared with conventional operator seats.

An operator seat for a construction machine according to a second aspect of the invention, in the operator seat according to the first aspect of the invention, further includes a rotation mechanism that allows the seat portion to rotate in a substantially horizontal direction.

In this configuration, the operator seat further includes a mechanism that allows the seat portion to rotate in a substantially horizontal direction. The seat portion is included in the operator seat of the aforementioned hanging-from-above system.

In this case, the rotation mechanism can rotate the seat portion together with the hanging portion about a rotation shaft that is disposed on the ceiling surface, or can rotate the seat portion independently of the hanging portion.

Accordingly, rotation of the operator seat allows the operator to easily step into/off the cab. In addition, even in a case where the operator is required to turns operator's face to the rear when operating the construction machine, the operator can rotate the operator seat and thus can easily look behind.

An operator seat for a construction machine according to a third aspect of the invention, in the operator seat according to the second aspect of the invention, further includes a rotation locking mechanism that selectively restricts the rotation of the seat portion and selectively releases the restriction.

In this configuration, the rotation locking mechanism brings the seat portion of the operator seat in a rotatable state or in a rotation-restricted state.

In this case, an example of the locking mechanism is provided by an insertion opening and an insertion rod that can be inserted into the insertion opening to restrict rotation of the rotatable seat portion. The insertion opening is formed on the seat portion side.

In this configuration, the seat portion can rotate when the operator steps into/off the cab, on the other hand, rotation of the seat portion is restricted after the operator sits on the seat portion, therefore, it is possible to improve operability when operator operates the construction machine. In addition, in a case where the operator turns operator's face to the rear to look behind when operating the construction machine, for example, the operator releases the restriction of the locking mechanism to allow the seat portion to rotate, and thus can easily look behind as compared with conventional operator seats.

Accordingly, the operator can switch the locking mechanism between restriction of rotation of the seat portion and release of the restriction if necessary. Therefore, it is possible to extensively improve operability, and ease of stepping into/off the cab for the operator as compared with conventional operator seats.

An operator seat for a construction machine according to a fourth aspect of the invention, in the operator seat according to any of the first to third aspects of the invention, further includes a slide mechanism that allows the seat section of the seat portion to slide frontward and rearward relative to the hanging portion.

In this configuration, in the operator seat that employs the aforementioned hanging-from-above system, the seat section that is included in the seat portion slides frontward and rearward relative to the hanging portion.

In this case, since the seat section slides rearward relative to the hanging portion, it is possible to provide space required for the operator to step into/off the cab as much as possible when the operator steps into/off the cab. In addition, in a case where the angle of the backrest section is adjusted in accordance with slide movement of the seat section, it is possible to improve the comfort for the operator.

An operator seat for a construction machine according to a fifth aspect of the invention, in the operator seat according to any of the first to fourth aspects of the invention, further includes an angle adjustment mechanism that adjusts the angle of the backrest section of the seat portion with respect to the seat section.

In this configuration, the angle of the backrest section that is included in the seat portion can be adjusted by the angle adjustment mechanism.

In this case, since the backrest section can tilt to the rearmost position when the operator steps into/off the cab, it is possible to improve ease of stepping into/off the cab. Additionally, the angle of the backrest section can be adjusted to meet operator's need.

An operator seat for a construction machine according to a sixth aspect of the invention, in the operator seat according to any of the first to fifth aspects of the invention, the hanging portion includes a protection structure that extends from a ceiling part of the cab to a connection part between the hanging portion and the seat portion to protect an operator's head.

In this configuration, the hanging portion that is secured and hung from the ceiling surface of the cab includes a protection structure that has strength to protect operator's head.

Accordingly, since the protection structure is provided by stiffness of the hanging portion of the operator seat is added separately from protection for the operator that is provided by stiffness of the cab such as ROPS of the cab, it is possible to more surely provide sufficient space above operator's head.

A cab for a construction machine according to a seventh aspect of the invention includes the operator seat for a construction machine according to in any of the first to sixth aspects of the invention, and a door that is disposed in the side or the rear of the operator seat.

In this configuration, the aforementioned operator seat is provided in the cab that includes the door that is disposed in the side or the like of the operator seat.

Accordingly, even in case that the ceiling surface is damaged due to a load applied onto the ceiling surface, the operator seat can move to the height corresponding to the floor, therefore, it is possible to provide a cab that can provide more sufficient space above operator's head similarly to the above effect as compared with conventional cabs.

A cab for a construction machine according to an eighth aspect of the invention, in the cab according to the seventh aspect of the invention, further includes an operation portion that is disposed in the front or the side of the seat portion and can tilt upward and downward.

In this configuration, in the operator seat that employs the aforementioned hanging-from-above system, the operation portion that is tiltable upward and downward is used as an operation device for the operation of the construction machine.

Herein, the term "tiltable upward and downward" referred includes meaning of "swingable frontward and rearward about a pivot axis that is disposed in the front of or in the rear of the seat portion so as to move to a predetermined position to get out of the way", for example. In addition, the operation portion can include a joystick, a lever handle, and a typical steering wheel. Additionally, the above terms "in the front of" and "in the rear of" are used in a sense that the front-to-rear direction is defined by the "front" that is a direction that the operator who steps into/off the cab of the construction machine faces when sitting on the operator seat to operate the construction machine.

Accordingly, since the operation portion, which may interfere with the operator when the operator steps into/off the cab, tilts upward and downward so as to move to a predetermined position to get out of the way, it is possible to ensure that the operator easily steps into/off the cab. In addition, in a case of combination with the aforementioned rotation mechanism of the seat portion, it is possible to extensively improve ease of stepping into/off the cab as compared with conventional cabs.

A cab for a construction machine according to a ninth aspect of the invention, in the cab according to the eighth aspect of the invention, the operation portion includes an arm section that includes an operation part that is configured and arranged to be operated by the operator, and a support section that supports the arm section. In addition, both the arm and support sections are tiltable upward and downward.

In this configuration, both the arm and support sections that are included in the operation portion are tiltable upward and downward.

In this case, the operation part that is disposed on the arm section can include a plate member with a various types of operation levers and buttons that are disposed thereon, a joystick, a lever handle, and so on.

Accordingly, the operation portion can tilt to two tilt-up positions. As a result, the degree of tilt can be adjusted depending on the situation. For example, the operation portion is swingable upward to the furthest position in two tilt-up positions to get out of the way, when the operator steps into/off the cab. Therefore, it is possible to sufficiently provide ease of stepping into/off the cab for the operator.

A construction machine according to a tenth aspect of the invention includes the cab according to any of the seventh to ninth aspects of the invention.

Types of the construction machines provided with a cab are as a wheel loader, a bulldozer, a hydraulic excavator, and a motor grader.

Accordingly, as stated above, even in case that the ceiling surface is damaged due to a load applied onto the ceiling surface, the operator seat can move to the height corresponding to the floor, therefore, it is possible to provide a construction machine that can provide more sufficient space above operator's head similarly to the above effect as compared with conventional construction machines.

BRIEF DESCRIPTION OF THE DRAWINGS

FIG. 1 is a perspective view showing overall configuration of a wheel loader that is provided with a cab that includes an operator seat according to one embodiment of the present invention.

FIG. 2 is a perspective view showing the configuration of the cab of the wheel loader shown in FIG. 1.

FIG. 3 is a perspective view showing the configuration of the operator seat and so on provided in the cab shown in FIG. 2.

FIG. 4 is a perspective view showing the configuration of a steering device that is disposed in front of the operator seat shown in FIG. 3.

FIG. 5 is a perspective view showing a state where the steering device in FIG. 4 is moved to a standing position.

FIG. 6 is a perspective view showing the configuration of a rotation mechanism that is located on a ceiling surface of the cab shown in FIG. 2 to rotate the operator seat.

FIG. 7 is a perspective view showing a monitor that is mounted to the steering device shown in FIG. 4.

FIG. 8 is a perspective view showing the configuration of an operator seat according to another embodiment of the present invention.

Figure 9:
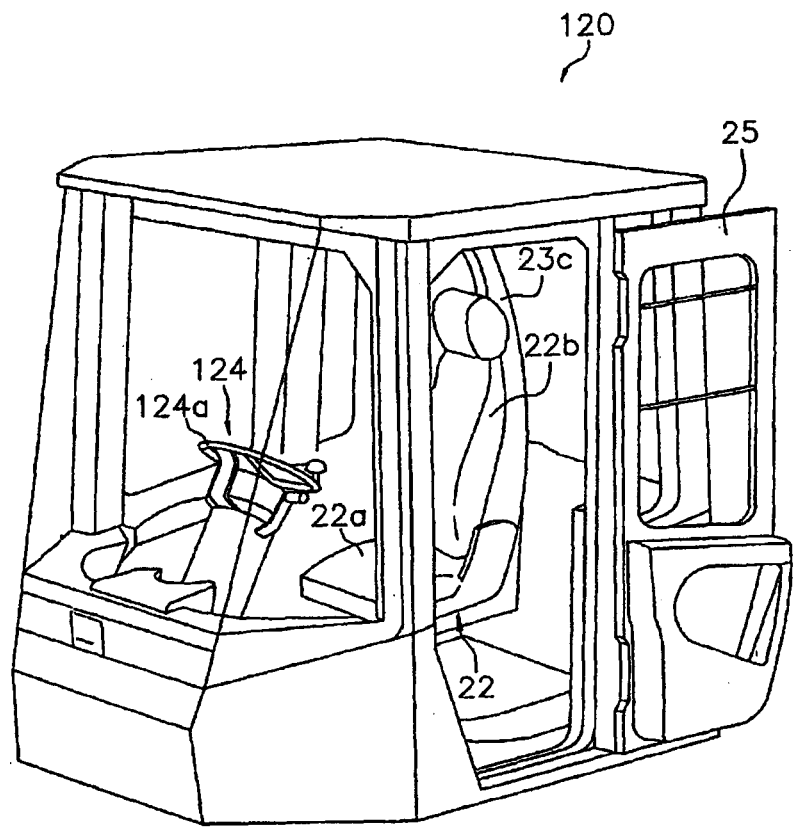

FIG. 9 is a perspective view showing the configuration of a cab that includes an operator seat according to still another embodiment.

Figure 10:
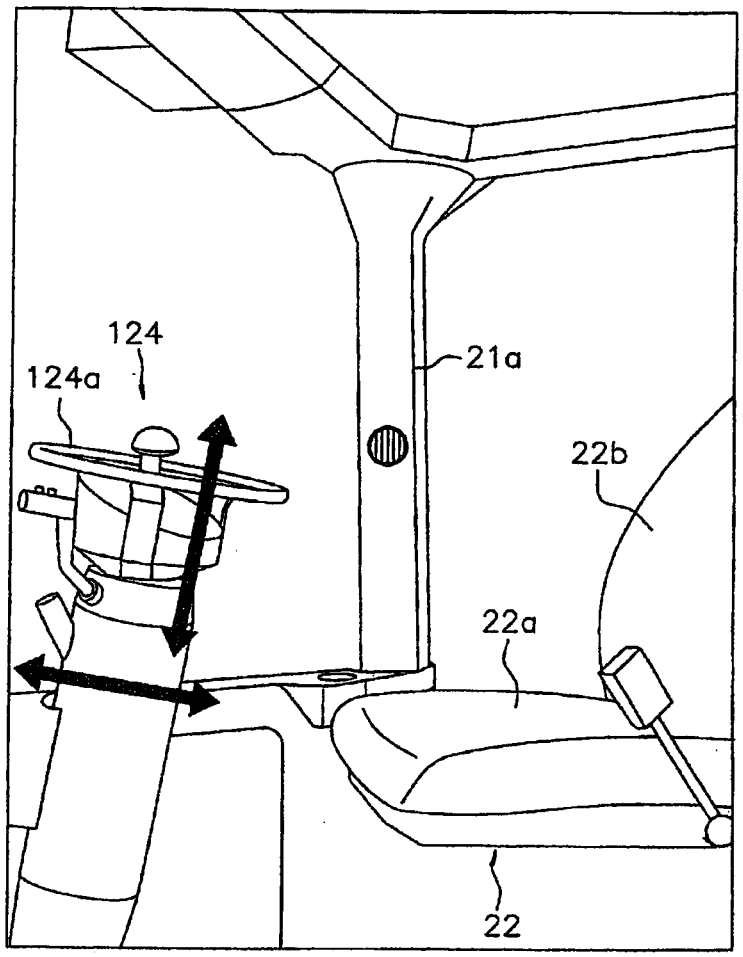

FIG. 10 is a perspective view showing the positional relationship between a steering device and the operator seat that are provided in the cab shown in FIG. 9.

DETAILED DESCRIPTION OF THE PREFERRED EMBODIMENTS

With reference to FIGS. 1 to 7, the following description will describe an operator seat portion (seat portion, operator seat) 22 that is disposed in a cab 20 of a wheel loader (construction machine) 10 according to one embodiment of the present invention.

As used herein to describe the present invention, the following terms "front", "rear", "right", and "left" refer to the directions as follows. The term "front" should be defined as a direction that an operator faces in a state where the operator sits on the operator seat (the advance side of the wheel loader 10). The term "rear" should be defined as the reverse side of the wheel loader 10. The term "right" should be defined as the right side of the operator in a state where the operator faces toward the advance side, and the term "left" should be defined as a direction opposite to the right side of the operator.

Overall Configuration of Wheel Loader 10

As shown in FIG. 1, a cab structure according to this embodiment is applied to a cab 20 that is mounted on the wheel loader 10.

The wheel loader 10 includes a body unit 11, a lift arm 12, a bucket 13, four tires 14, and the cab 20. The lift arm 12 is mounted to the front part of the body unit. The bucket 13 is mounted to the fore end of the lift arm 12. The tires 14 support the body unit 11, and rotate so that the body unit runs. The cab 20 is mounted on an upper part of the body unit 11.

The body unit 11 includes an engine room and an actuator portion. The engine room accommodates an engine (not shown). The actuator portion actuates the lift arm 12 and the bucket 13.

The lift arm 12 is an arm member that lifts the bucket 13 mounted to the fore end of the lift arm 12, and is actuated by a lift cylinder that is installed together.

The bucket 13 is mounted to the fore end of the lift arm 12. A bucket cylinder controls dumping and tilting of the bucket 13.

The cab 20 has Rollover Protective Structure (hereinafter, referred to as ROPS), and includes a door 25 that is disposed on the right side surface of the cab 20. The cab 20 forms an operator compartment for the operator that is composed of combination of a plurality of steel pipes and plates. The cab 20 is disposed slightly frontward of the middle part of the body unit 11. The structure of the cab 20 and its mount structure will be described bellow.

Structure of Cab 20

As shown in FIG. 2, the operator seat portion 22 and a steering device (operation portion) 24 are disposed in the interior compartment of the cab 20 according to this embodiment. The interior compartment is formed by the door 25, a front windshield FG, and so on that are mounted to a frame portion. The frame portion is formed by a plurality of pole members $21a$-$21f$, and so on.

In the pole members $21a$-$21f$, the front-right, front-left, rear-right and rear-left corner pole members $21a$, $21b$, $21c$ and $21d$ are arranged in the proximity of four corners of the cab 20, and the right-middle and left-middle pole members $21e$ and $21f$ are arranged on the left and right side surfaces of the cab 20, respectively.

As shown in FIG. 3, the operator seat portion 22 includes a seat section $22a$ and a backrest (backrest section) $22b$. The operator (driver) who operates the wheel loader 10 sits on the seat section $22a$. The backrest $22b$ supports operator's back. The operator seat portion 22 is located in the proximity of a middle part of the cab 20. The operator seat portion 22 moves frontward and rearward along slide rails (not shown) that are included in a slide mechanism 41. The slide mechanism 41 is disposed on a bottom-side support section $23d$ of a hanging-from-above mechanism (hanging portion, rotation mechanism, operator seat) 23. In addition, the angle of the backrest $22b$ of the operator seat portion 22 can be also adjusted by an angle adjustment mechanism 42. Specifically, the angle adjustment mechanism 42 adjusts the angle of the backrest $22b$ by frontward and rearward movement of the bottom end of the angle adjustment mechanism 42 in accordance with frontward and rearward slide movement of the seat section $22a$. In this configuration, the operator slides the seat section $22a$ frontward and rearward, or adjusts the backrest section $22b$ to a desired angle to meet operator's need when stepping into/off the cab or operating the wheel loader, therefore, it is possible to improve the comfort for the operator in the cab 20. The hanging-from-above mechanism 23 that supports the operator seat portion 22 from above will be described below.

As shown in FIG. 2, for example, the steering device 24 is disposed between the operator seat portion 22 and the front windshield FG. The operator operates operation levers (operation part) 31, a switch panel (operation part) 32 and so on (see FIG. 4, described later) to changes the traveling direction of the wheel loader 10 or to control the bucket 13, and so on. The structure of the steering device 24 will be also described later.

The door 25 is attached to the right side of the cab 20, and pivots about hinges as a pivot axis that are secured to the right-middle pole member $21e$ so that the door 25 is opened/closed outside the cab 20.

[Structure of Hanging-From-Above Mechanism 23 of Operator Seat Portion 22]

As shown in FIG. 3, for example, the operator seat portion 22 according to this embodiment is supported by the hanging-from-above mechanism 23. The hanging-from-above mechanism 23 supports the operator seat portion 22 from above so that the operator seat portion 22 is hung. The hanging-from-above mechanism 23 is connected to a ceiling surface $20a$ of the cab 20.

The hanging-from-above mechanism 23 connects the operator seat portion 22 to the ceiling surface $20a$ of the cab 20, and serves as a rotation mechanism that changes the orientation of the operator seat portion 22. The hanging-from-above mechanism 23 includes a rotation shaft $23a$, a ceiling-side support section $23b$, a backside support section $23c$, and a bottom-side support section $23d$.

As shown in FIG. 3, the rotation shaft $23a$ is disposed substantially perpendicular to the ceiling surface $20a$, and serves as a rotation axis for changing the orientation of the operator seat portion 22 when the operator steps into/off the cab. The rotation shaft 23a is inserted into an opening that is formed in the ceiling-side support section 23b.

The ceiling-side support section 23b rotates together with the operator seat portion 22 in a substantially horizontal direction about a part corresponding to the opening that is provided with the rotation shaft 23a inserted thereto. As shown in FIG. 6, for example, the rotation range of the ceiling-side support section 23b is restricted by a recessed portion 20b that is formed on the ceiling surface 20a of the cab 20 and has a stepped shape. That is, the side surfaces of the ceiling-side support section 23b come in contact with the stepped-shape parts of the recessed portion 20b as a recessed part of the ceiling surface 20a. This contact restricts the ceiling-side support section 23b into a predetermined rotation angle in the rightward and leftward rotation directions. Accordingly, the operator seat portion 22 is rotated in a desired rotational direction, when the operator steps into/off the cab 20. Therefore, it is possible to improve ease of stepping into/off the cab. In addition, in operation of the wheel loader, when the operator turns operator's face to the rear to look behind in a state where the operator sits on the operator seat portion 22, rotation of the operator seat portion 22 allows the operator to easily look behind. The restriction of the rotation range within the predetermined range can prevent the operator seat portion from rotating too much than required. The ceiling-side support section 23b is connected to the backside support section 23c at an L-shaped part. A protection structure that protects an area in the proximity of operator's head is formed by integrally forming the ceiling-side support section 23b and the backside support section 23c, or by employing a structure that firmly connects both sections. As a result, even in case that a large load is applied onto an upper part of the cab 20 and the upper part of the cab 20 is deformed, the area in the proximity of operator's head can be protected by the protection structure composed of the ceiling-side support section 23b and the backside support section 23c.

The backside of the backrest 22b of the operator seat portion 22 is attached to the backside support section 23c. The top and the bottom of the backside support section 23c are connected to the ceiling-side support section 23b and the bottom-side support section 23d, respectively.

The bottom-side support section 23d is a substantially L-shaped support member that is connected to the bottom of the backside support section 23c, and supports the bottom surface of the seat section 22a of the operator seat portion 22.

In this embodiment, since thus-constructed hanging-from-above mechanism 23 supports the operator seat portion 22, it is not necessary to provide a member that is disposed on the floor of the cab 20 to support the operator seat portion 22. For this reason, as shown in FIG. 3, space S is provided under the bottom-side support section 23d.

Accordingly, even in case that the cab 20 is deformed due to a large load that is applied on to the ceiling surface of the cab 20, the operator seat portion 22 can be moved into the space S that is provided between the operator seat portion 22 and the floor of the cab 20. As a result, even in case that an upper part of the cab 20 is deformed, for example, it is possible to efficiently prevent that shock is applied to an area in the proximity of operator's head as compared with conventional operator seats. In addition, in a normal condition, since the space S is normally provided under the operator seat portion 22, it is possible to improve ease of cleaning up the interior of the cab 20.

Structure of Steering Device 24

In this embodiment, the steering device 24 includes left and right arm sections (arm sections) 24a and 24b, and a support section 24c.

As shown in FIG. 4, the operation levers 31 and the switch panel 32 are disposed on the top surfaces of the left and right arm sections 24a and 24b in a horizontal position, respectively. The left and right arm sections 24a and 24b are connected to the support section 24c that stands on the floor of the cab 20 through a pivot shaft 24d. The left and right arm sections 24a and 24b integrally pivot upward and downward relative to the support section 24c about the pivot shaft 24d. As shown in FIGS. 3 and 4, the left and right arm sections 24a and 24b extends in a substantially horizontal direction. In this horizontal position, the fore ends of the left and right arm sections 24a and 24b extend in the front-to-rear direction to reach a part in the proximity of the backrest 22b of the operator seat portion 22 so that the operator who sits on the operator seat portion 22 is surrounded by the left and right arm sections 24a and 24b, for example. On the other hand, in a standing position, as shown in FIG. 5, the left and right arm sections 24a and 24b pivot to a position along the front windshield FG so that the operator can freely approach space between the operator seat portion 22 and the steering device 24, and space in the side of the operator seat portion 22.

The support section 24c stands on the floor of the cab 20 to support the left and right arm sections 24a and 24b. Specifically, as shown in FIG. 5, the support section 24c is disposed between the operator seat portion 22 and the front windshield FG in the front-to-rear direction, and between an accelerator pedal 26 and a brake pedal 27 in the left-to-right direction. As shown in FIG. 4, the tilt angle of the support section 24c can be adjusted in the front-to-rear direction about a connection part between the support section 24c and the floor of the cab 20 as a pivot axis. In addition, as shown in FIG. 7, a folding monitor 28 is mounted to an upper part of the support section 24c.

The monitor 28 is unfolded at the upper part of the support section 24c as shown in FIG. 7 when required, for example, when the operator operates the wheel loader, and pivots about a pivot shaft (not shown) that is disposed on the backside of the support section 24c and thus is folded onto the backside of the support section 24c when not in use. Accordingly, it is possible to minimize reduction of operator's range of front vision due to the monitor 28 installation, and to ensure the maximum operator's range of vision.

In this embodiment, the steering device 24 that is tiltable upward and downward is used in combination with the operator seat portion 22 that is supported from above by the aforementioned hanging-from-above mechanism 23.

Thus, the left and right arm sections 24a and 24b pivot and swing upward from the normal horizontal position shown in FIGS. 3 and 4 to the standing position along the front windshield FG shown in FIG. 5. Accordingly, this structure ensures wide space between the operator seat portion 22 and the steering device 24. Therefore, it is possible to further improve ease of stepping into/off the cab for the operator.

In a case where the tilt angle of the support section 24c can be changed upward and downward together with the left and right arm sections 24a and 24b, the position of the steering device 24 can be changed in two tilt-up positions. As a result, the operator can choose whether only the left and right arm sections 24a and 24b pivot to the standing position, or the support section 24c additionally pivots to the standing position depending on the situation when operator steps into/off the cab.

Features of Operator Seat Portion 22 of Wheel Loader 10

(1) The operator seat portion 22 of the wheel loader 10 according to this embodiment is disposed in the cab 20 of the wheel loader 10, as shown in FIG. 1. The operator seat portion 22 includes the seat section 22a that the operator sits on, and the backrest 22b, as shown in FIG. 3. A part of operator seat portion 22 is connected to the ceiling surface 20a of the cab 20, and is supported by the hanging-from-above mechanism 23 in a hanging-from-above manner.

Accordingly, the space S can be provided between the operator seat portion 22 that the operator sits on, and the floor of the cab 20, as shown in FIG. 3. The space S that is formed under the operator seat portion 22 not only provides ease of cleaning up the interior of the cab 20 but also provides protection space above operator's head in case that an upper part of the cab 20 is deformed or damaged, for example. Specifically, even in case that the hanging-from-above mechanism 23 that supports the operator seat portion 22 is disconnected from the ceiling surface 20a due to deformation or the like of the upper part of the cab 20, since the space S exists under the seat, the operator seat portion 22 falls onto the floor of the cab 20. Therefore, it is possible to more surely provide the protection space above operator's head as compared with conventional cabs in case of deformation or the like of the upper part of the cab.

(2) The operator seat portion 22 of the wheel loader 10 according to this embodiment is hung from the ceiling surface 20a of the cab 20 by the hanging-from-above mechanism 23, as shown in FIG. 3. In addition, the operator seat portion 22 rotates in a substantially horizontal direction about the rotation shaft 23a that is included in the hanging-from-above mechanism 23.

Accordingly, in a case where the hanging-from-above mechanism 23 is used, since the operator seat portion 22 can be turned toward the stepping into/off door 25, it is possible to sufficiently provide ease of stepping into/off the cab for the operator. In addition, in a state where the operator sits on the operator seat portion 22, when the operator turns operator's face to the rear to look behind, rotation of the operator seat portion 22 allows the operator to easily look behind. As a result, since the operator seat portion 22 and the hanging-from-above mechanism 23 are provided, it is possible to provide the cab 20 that provides ease of stepping into/off the cab, and additionally provides excellent workability.

(3) As shown in FIGS. 4 and 5, the operator seat portion 22 of the wheel loader 10 according to this embodiment is opposed to the steering device 24 that can pivot upward and downward and can be changed between the normal horizontal position (see FIG. 4) and the standing position (see FIG. 5).

Accordingly, since the cab 20 is configured to have the left and right arm sections 24a and 24b of the steering device 24 that are orientated in the standing position when the operator steps into/off the cab, and are orientated in the horizontal position when the operator drives the wheel loader, for example, it is possible to provide the cab 20 that provides ease of stepping into/off the cab and excellent operability. In particular, as compared with typical steering-wheel type steering devices, it is possible to provide large space in the front of the operator seat portion 22 when the operator stepping into/off the cab. Therefore, it is possible to sufficiently provide ease of stepping into/off the cab 20.

(4) In the operator seat portion 22 of the wheel loader 10 according to this embodiment, as shown in FIGS. 4 and 5, the steering device 24 is disposed in front of the operation seat portion 22 and is opposed to the operator seat portion 22. The support section 24c and the left and right arm sections 24a and 24b included in the steering device 24 can be pivoted.

Accordingly, for example, when the operator steps into/off the cab 20, the operator can change the position of the steering device 24 in two tilt-up positions by pivoting the left and right arm sections 24a and 24b, and the support section 24c. As a result, required amount of space can be provided in front of the operator seat portion 22. Therefore, it is possible to improve ease of stepping into/off the cab.

(5) The operator seat portion 22 of the wheel loader 10 according to this embodiment further includes the slide mechanism 41 that slides the seat section 22a frontward and rearward, as shown in FIG. 3.

Accordingly, in a case where the hanging-from-above system is employed for the operator seat portion 22, the operator can operate the wheel loader 10 at a comfortable seat position for the operator by sliding the seat section 22a frontward and rearward. In addition, it is preferable that the seat section 22a is slid to the rearmost position when the operator steps into/off the cab. As a result, space in front of the operator seat portion 22 can be provided as much as possible when the operator steps into/off the cab. Therefore, it is possible to sufficiently provide ease of stepping into/off the cab.

(6) The operator seat portion 22 of the wheel loader 10 according to this embodiment, further includes the angle adjustment mechanism 42 that adjusts the angle of the backrest 22b, as shown in FIG. 3.

Accordingly, in a case where the hanging-from-above system is employed for the operator seat portion 22, the operator can operate the wheel loader 10 also at comfortable condition for the operator by adjusting the angle of the backrest 22b. In addition, it is preferable that the backrest 22b is tilted toward the rearmost position when the operator steps into/off the cab. As a result, space in the front of the operator seat portion 22 can be provided as much as possible. Therefore, it is possible to sufficiently provide ease of stepping into/off the cab.

(7) In the operator seat portion 22 of the wheel loader 10 according to this embodiment, as shown in FIG. 3, the ceiling-side support section 23b and the backside support section 23c that are included in the hanging-from-above mechanism 23 are connected in an L-shaped state, and extends from the backside of to the topside of the hanging-from-above mechanism 23 to cover operator's head.

Accordingly, even in case that the ceiling surface 20a or the like of the cab 20 is damaged due to shock applied onto the ceiling surface 20a, for example, the ceiling-side support section 23b and the backside support section 23c can protect operator's head. In addition, in a case where the hanging-from-above mechanism 23 also serves as a protection structure for operator's head, it is preferable that the hanging-from-above mechanism 23 is designed in consideration of the material of the ceiling-side support section 23b and the backside support section 23c and strength of the connection part and so on.

(8) In the cab 20 of the wheel loader 10 according to this embodiment includes the aforementioned operator seat portion 22 and the hanging-from-above mechanism 23, as shown in FIG. 2.

Therefore, the cab 20 can have effects similar to the aforementioned effects that improve ease of cleaning up the interior of the cab, and more surely provide the protection space above operator's head in case of deformation or the like of the upper part of the cab as compared with conventional cabs.

(9) The wheel loader 10 according to this embodiment includes the aforementioned cab 20, as shown in FIG. 1.

Therefore, the wheel loader 10 can have effects similar to the aforementioned effects that improve ease of cleaning up the interior of the cab, and more surely provide the protection space above operator's head in case of deformation or the like of the upper part of the cab as compared with conventional wheel loaders.

Other Embodiments

The foregoing description has described one embodiment according to the present invention. However, the present invention is not limited to the foregoing embodiment. Various changes and modifications can be made without departing from the spirit of the present invention.

(A) In the foregoing embodiment, the operator seat portion 22 freely pivots within the predetermined range about the rotation shaft 23a of the hanging-from-above mechanism 23. However, the present invention is not limited to this configuration.

For example, as shown in FIG. 8, a locking mechanism (rotation locking mechanism) 40 that restricts rotation of the operator seat portion 22 may be disposed on the side of the backrest 22b of the operator seat portion 22, or the like.

In this case, when the operator steps into/off the cab, the operator seat portion 22 can be in a rotateble state. On the other hand, after the operator sits on the operator seat portion 22, the operator can pivot an insertion portion 40b of the locking mechanism 40 about a pivot shaft 40a so that the insertion portion 40b is inserted into an engagement portion 40c that is formed on a rear wall of the cab 20. Thus, rotation of the operator seat portion 22 is restricted. Accordingly, operator's posture becomes stable in operation of a wheel loader, for example, therefore, it is possible to improve operability of a construction machine such as a wheel loader.

(B) In the foregoing embodiment, as shown in FIGS. 4 and 5, the steering device 24 that is opposed to the operator seat portion 22 includes the left and right arm sections 24a and 24b that can be changed their position upward and downward. However, the present invention is not limited to this configuration.

For example, as shown in FIGS. 9 and 10, a cab 120 that includes a steering device (operation portion) 124 with a typical steering wheel 124a may be used. In the cab 120, the steering device 124 is used in combination with the operator seat portion 22 of the hanging-from-above mechanism system. In the steering device 124, the height and the position in the front-to-rear direction of the steering wheel 124a can be minutely adjusted depending on operators, as shown in FIG. 10. In this case, a typical steering device 124 can be used in combination with the operator seat portion 22, additionally, rotation of the operator seat portion 22 ensures ease of stepping into/off the cab for the operator.

In terms of ease of stepping into/off the cab for the operator, it is preferable that the steering device 24 of the swing-up system according to the foregoing embodiment is used in combination with the operator seat portion 22 of the hanging-from-above mechanism system. The reason is that space in front of the operator seat portion 22 can be sufficiently provided as compared with the configuration in which the steering device 124 that includes the typical steering wheel 124a shown in FIGS. 9 and 10 is used in combination with the operator seat portion 22.

(C) In the foregoing embodiment, the hanging-from-above mechanism 23 that connects a part of the operator seat portion 22 to the ceiling surface 20a of the cab 20 extends from the bottom surface of the seat section 22a to the back surface of the backrest 22b of the operator seat portion 22 to support the operator seat portion 22. However, the present invention is not limited to this configuration.

For example, the hanging-from-above mechanism 23 may support only a seat section or only a backrest.

(D) In the foregoing embodiment, the operator seat portion 22 rotates about the rotation shaft 23a that is secured to an upper part of the hanging-from-above mechanism 23 that is located on the ceiling surface 20a of the cab 20. However, the present invention is not limited to this configuration.

It is not always necessary to locate the rotation shaft on the ceiling surface. For example, a rotation shaft may be located in a connection part between the hanging portion and the seat portion.

In this case, rotation of the seat portion when the operator steps into/off the cab allows the operator to easily step into/off the cab.

(E) In the foregoing embodiment, the left and right arm sections 24a and 24b that are included in the steering device 24 integrally pivot. However, the present invention is not limited to this configuration.

For example, the steering device may include the left and right arm sections that independently pivot.

In this case, for example, the operator is required to pivot only one arm section that is located in the side where the operator steps into/off the cab, thus, required pivoting torque is reduced. Therefore, the position of the arm section can be more smoothly changed.

(F) In the foregoing embodiment, the operator seat according to the present invention is applied to the cab of the wheel loader. However, the present invention is not limited to this configuration.

For example, the cab that includes the operator seat according to the present invention may be mounted to other construction machines such as a bulldozer, a hydraulic excavator, and a motor grader other than a wheel loader.

An operator seat for a construction machine according to the present invention has an effect that provides more sufficient space above operator's head as compared with conventional operator seats. Accordingly, the present invention can be widely applied to operator seats that are disposed in cabs of various types of construction machines.

The invention claimed is:

1. An operator seat for a construction machine disposed in a cab of the construction machine, the operator seat comprising:

a seat portion that includes a seat section on which an operator sits, and a backrest section that is mounted to the seat section in a direction that intersects the seat section;

a hanging portion connecting a part of the seat portion to a ceiling surface of the cab to suspend the seat portion from above; and a rotation mechanism that allows the seat portion to rotate about a rotation axis in a substantially horizontal direction, the rotation axis being disposed at a connecting part between the part of the seat portion and the ceiling surface of the cab.

2. The operator seat for a construction machine according to claim 1, further comprising a slide mechanism that allows the seat section of the seat portion to slide frontward and rearward relative to the hanging portion.

3. The operator seat for a construction machine according to claim 1, further comprising an angle adjustment mechanism that adjusts an angle of the backrest section of the seat portion with respect to the seat section.

4. The operator seat for a construction machine according to claim 1, wherein the hanging portion includes a protection structure that extends from a ceiling part of the cab to a connection part between the hanging portion and the seat portion to protect an operator's head.

5. A cab for a construction machine comprising:
the operator seat for a construction machine according to claim 1; and
a door that is disposed in a side portion of the operator seat.

6. The cab for a construction machine according to claim 5, further comprising
an operation portion disposed in front of the seat portion with the operation portion being tiltable upward and downward.

7. The cab for a construction machine according to claim 6, wherein
the operation portion includes an arm section that includes an operation part configured and arranged to be operated by the operator, and a support section that supports the arm section, both the arm section and the support section being tiltable upward and downward.

8. A construction machine comprising the cab for a construction machine according to claim 5.

9. An operator seat for a construction machine disposed in a cab of the construction machine, the operator seat comprising:

a seat portion that includes a seat section on which an operator sits, and a backrest section that is mounted to the seat section in a direction that intersects the seat section;
a hanging portion connecting a part of the seat portion to a ceiling surface of the cab to suspend the seat portion from above;
a rotation mechanism that allows the seat portion to rotate in a substantially horizontal direction; and
a rotation locking mechanism that selectively restricts a rotation of the seat portion and selectively releases the restriction.

10. An operator seat for a construction machine disposed in a cab of the construction machine, the operator seat comprising:
a seat portion that includes a seat section on which an operator sits, and a backrest section that is mounted to the seat section in a direction that intersects the seat section; and
a hanging portion connecting a part of the seat portion to a ceiling surface of the cab to suspend the seat portion from above with the hanging portion including a protection structure that substantially prohibits a vertical movement of the seat portion with respect to the ceiling surface.

* * * * *